(12) United States Patent
Endo et al.

(10) Patent No.: US 10,581,772 B2
(45) Date of Patent: Mar. 3, 2020

(54) INFORMATION PROCESSING METHOD, INFORMATION PROCESSING APPARATUS, AND RECORDING MEDIUM HAVING PROGRAM RECORDED THEREON

(71) Applicant: Panasonic Intellectual Property Management Co., Ltd., Osaka (JP)

(72) Inventors: Mitsuru Endo, Tokyo (JP); Katsuyoshi Yamagami, Osaka (JP); Takashi Ushio, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 244 days.

(21) Appl. No.: 15/814,832

(22) Filed: Nov. 16, 2017

(65) Prior Publication Data

US 2018/0159806 A1    Jun. 7, 2018

(30) Foreign Application Priority Data

Dec. 6, 2016  (JP) .................................. 2016-237094
Jul. 21, 2017  (JP) .................................. 2017-142168

(51) Int. Cl.
*H04L 12/58* (2006.01)
*H04L 29/08* (2006.01)
(Continued)

(52) U.S. Cl.
CPC .......... *H04L 51/046* (2013.01); *G06F 3/0482* (2013.01); *G06F 16/3329* (2019.01);
(Continued)

(58) Field of Classification Search
CPC ...... H04L 51/046; H04L 51/02; H04L 67/325
(Continued)

(56) References Cited

U.S. PATENT DOCUMENTS 7,389,265 B2 *  6/2008  Lawrence .............. G06Q 20/04
                                                 705/38
8,037,147 B1 *  10/2011  Herold .................. G06Q 10/10
                                                 709/206
(Continued)

FOREIGN PATENT DOCUMENTS

JP          2013-117938          6/2013

OTHER PUBLICATIONS

"A Chatbot-based Interactive Question Answering System"—Quarteroni et al, University of York, 11th Workshop on the Semantics and Pragmatics of Dialog, Jun. 1, 2007 https://pdfs.semanticscholar.org/7e34/968ec289f46931ed86f8c93797f93e93ce22.pdf (Year: 2007).*

(Continued)

*Primary Examiner* — Randy A Scott
(74) *Attorney, Agent, or Firm* — Greenblum & Bernstein, P.L.C.

(57) ABSTRACT

In an information processing method, display of a question and acquisition of an answer from a user to the question are repeated to narrow down information the user desires to make a search. A question regarding a target of the search is displayed in a first mode on a display included in a terminal. An answer inputted from the user to the question is acquired through the terminal. When the question is displayed, first information regarding a situation of a narrowing-down progress is displayed above the question in a second mode, and second information regarding a guide for answering the question is displayed below the question in a third mode.

21 Claims, 20 Drawing Sheets

(51) Int. Cl.
    *G06F 17/24*     (2006.01)
    *G06F 3/0482*     (2013.01)
    *G06F 16/332*     (2019.01)
    *G06F 16/33*     (2019.01)
    *H04L 29/06*     (2006.01)

(52) U.S. Cl.
    CPC ........ *G06F 16/3338* (2019.01); *G06F 17/243* (2013.01); *H04L 51/02* (2013.01); *H04L 67/325* (2013.01); *H04L 65/40* (2013.01); *H04L 67/30* (2013.01)

(58) Field of Classification Search
    USPC .......................... 709/203, 204, 205, 206, 219
    See application file for complete search history.

(56) References Cited

U.S. PATENT DOCUMENTS

| | | | |
|---|---|---|---|
| 10,218,649 B2 * | 2/2019 | Joo ........................ | H04L 51/02 |
| 2012/0023121 A1 | 1/2012 | Foulger et al. | |
| 2013/0103712 A1 | 4/2013 | Li et al. | |
| 2013/0144961 A1 * | 6/2013 | Park ..................... | H04L 51/046 |
| | | | 709/206 |
| 2014/0207882 A1 * | 7/2014 | Joo ........................ | H04L 51/04 |
| | | | 709/206 |

OTHER PUBLICATIONS

The Extended European Search Report dated Apr. 20, 2018 for the related European Patent Application No. 17204324.2.

\* cited by examiner

FIG. 10

| QUESTION TYPE/ANSWER TYPE | APPLICATION CONDITION | TEMPLATE |
|---|---|---|
| OPEN QUESTION | FIRST | What kind of recipe are you looking for? |
| | SECOND ONWARD | Any other condition? |
| CLOSED QUESTION | CONFIRMATION REGARDING "X" RELATION: *IsA "X" | Would "X" be fine? |
| | CONFIRMATION REGARDING "X" RELATION: *HasA "X" | Would "X" be fine for use? |
| KNOWLEDGE ACQUISITION QUESTION | * | For example, what kind of dish? |
| ANSWER | WHAT QUESTION REGARDING "X" RELATION: "Y" IsA "X" | For example, list_up("Y"). Would "X" be fine for use? |
| | WHAT QUESTION REGARDING "X" RELATION: "X" IsA "Z" | This is a kind of "Z". Would "X" be fine for use? |

FIG. 13

| QUESTION TYPE/ ANSWER TYPE | APPLICATION CONDITION | TEMPLATE |
|---|---|---|
| OPEN QUESTION | FIRST | What kind of travel plan are you looking for? |
| | SECOND ONWARD | Any other condition? |
| CLOSED QUESTION | * | Would you choose a plan "X"? |
| KNOWLEDGE ACQUISITION QUESTION | * | For example, what kind of travel? |
| ANSWER | WHERE QUESTION REGARDING "X" RELATION: "Y" IsA "X" | For example, list_up("Y"). Would you choose a plan "X"? |
| | WHERE QUESTION REGARDING "X" RELATION: "X" IsA "Z" | You can find in "Z". Would you choose a plan "X"? |

FIG. 16

| QUESTION TYPE/ ANSWER TYPE | APPLICATION CONDITION | TEMPLATE |
|---|---|---|
| OPEN QUESTION | FIRST | What kind of property are you looking for? |
| | SECOND ONWARD | Any other condition? |
| CLOSED QUESTION | * | Would you rather choose a "X" property? |
| KNOWLEDGE ACQUISITION QUESTION | * | For example, what kind of property? |
| ANSWER | WHAT QUESTION REGARDING "X" RELATION: "Y" IsA "X" | For example, list_up("Y"). Would you rather choose a "X" property? |
| | WHAT QUESTION REGARDING "X" RELATION: "X" IsA "Z" | An example of "Z". Would you rather choose a "X" property? |

FIG. 19

| QUESTION TYPE/ ANSWER TYPE | APPLICATION CONDITION | TEMPLATE |
|---|---|---|
| OPEN QUESTION | FIRST | What kind of program are you looking for? |
| | SECOND ONWARD | Any other condition? |
| CLOSED QUESTION | * | Would "X" be fine? |
| KNOWLEDGE ACQUISITION QUESTION | * | For example, what kind of program? |
| ANSWER | WHAT QUESTION REGARDING "X" RELATION: "Y" IsA "X" | For example, list_up("Y"). Would "X" be fine? |
| | WHAT QUESTION REGARDING "X" RELATION: "X" IsA "Z" | An example of "Z". Would "X" be fine? |

INFORMATION PROCESSING METHOD, INFORMATION PROCESSING APPARATUS, AND RECORDING MEDIUM HAVING PROGRAM RECORDED THEREON

BACKGROUND

1. Technical Field

The present disclosure relates to information processing methods, information processing apparatuses, and recording media each having a program recorded thereon and, in particular, to an information processing method, information processing apparatus, and recording medium having a program recorded thereon for information processing by interaction with users.

2. Description of the Related Art

Conventionally, interactive systems for interaction by apparatuses such as computers with users have been known.

For example, Japanese Unexamined Patent Application Publication No. 2013-117938 discloses a technique for interaction between a chatbot and a user on a chat application. Here, the chatbot is a technique in which a system performs a function of at least one participant on a chat application platform initially provided to exchange messages between humans.

SUMMARY

However, in the technique disclosed in Japanese Unexamined Patent Application Publication No. 2013-117938, messages from the chatbot and messages from a human user are presented in a unified manner, and thus a question to be answered by the user may be obscured in the messages from the chatbot. In this case, the chatbot may not completely acquire, from the user, conditions regarding information the user desires to make a search.

In one general aspect, the techniques disclosed here feature an information processing method in which display of a question and acquisition of an answer from a user to the question are repeated to narrow down information the user desires to make a search, the information processing method including causing a question regarding a target for the search to be displayed in a first mode on a display included in a terminal, and causing an answer inputted from the user to the question to be acquired through the terminal, in which when the question is displayed, first information regarding a situation of a narrowing-down progress is displayed above the question in a second mode and second information regarding a guide for answering the question is displayed below the question in a third mode.

These general and specific aspects may be implemented using a system, a method, and a computer program, and any combination of systems, methods, and computer programs.

According to the information processing method and others of the present disclosure, conditions regarding information the user desires to make a search can be fully acquired by interaction with the user.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10 is a diagram of one example of sentence generation data according to the first example of the embodiment;

FIG. 13 is a diagram of one example of sentence generation data according to the second example of the embodiment;

FIG. 16 is a diagram of one example of sentence generation data according to the third example of the embodiment;

FIG. 19 is a diagram of one example of sentence generation data according to the fourth example of the embodiment.

DETAILED DESCRIPTION

Figure 1:
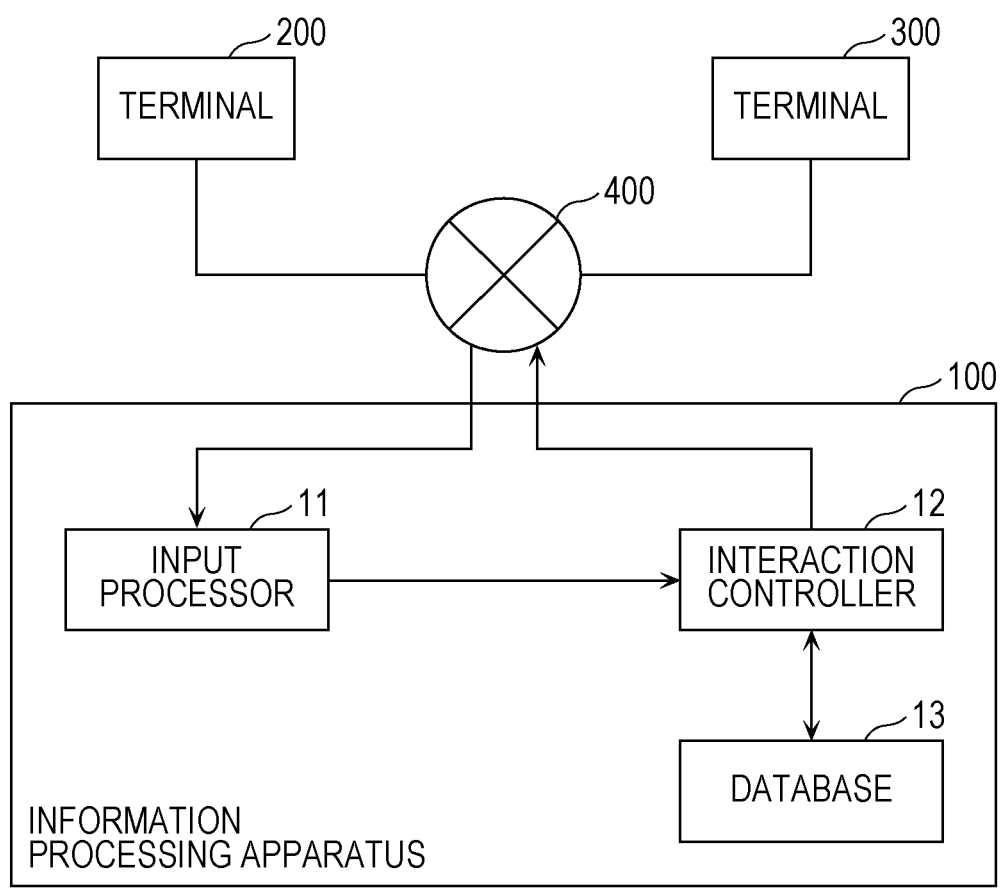
FIG. 1 is a schematic structural diagram of an information processing system according to an embodiment.

In an information processing method according to one aspect of the present disclosure, display of a question and acquisition of an answer from a user to the question are repeated to narrow down information the user desires to make a search. The information processing method includes causing a question regarding a target of the search to be displayed in a first mode on a display included in a terminal, and causing an answer inputted from the user to the question to be acquired through the terminal. When the question is displayed, first information regarding a situation of a narrowing-down progress is displayed above the question in a second mode and second information regarding a guide for answering the question is displayed below the question in a third mode.

With this structure, interaction information as a reference can be presented as being distinguishable from a system utterance display. Thus, the user can easily input a response to a system utterance. This allows conditions regarding information the user desires to make a search to be fully acquired by interaction with the user.

Here, for example, in the information processing method, information indicating a candidate for the target of the search acquired by the narrowing-down progress may be displayed on the display when the situation of the narrowing-down progress satisfies a predetermined condition.

For example, the predetermined condition may be that a number of the candidates for the target of the search is equal to or smaller than a predetermined number.

Also, for example, the question may be displayed in the first mode by displaying text indicating the question in a frame region surrounded by a frame in a balloon shape, a rectangular shape, or a corner-rounded rectangular shape under specifications specified with a predetermined font, font size, text color, background color, or typeface.

Also, for example, when the question is displayed, the first information may be displayed in the second mode by displaying text indicating the first information in a region outside and above the frame region under specifications specified with a predetermined font, font size, text color, background color, or typeface.

Also, for example, the specifications of the text indicating the question in the first mode and the specifications of the text indicating the first information in the second mode may be identical to each other.

Also, for example, when the question is displayed, the second information may be displayed in the third mode by displaying text indicating the second information in a region outside and below the frame region under specifications specified with a predetermined font, font size, text color, background color, or typeface.

Also, for example, the specifications of the text indicating the question in the first mode and the specifications of the text indicating the second information in the third mode may be identical to each other.

Also, for example, the specifications of the text indicating the first information in the second mode and the specifications of the text indicating the second information in the third mode may be identical to each other.

Also, for example, the first information may include a number of the targets of the search when the question is displayed.

Also, for example, the first information may include a remaining number of a predetermined total number of times allowed to question when the question is displayed.

Also, for example, the first information may include a degree of progress indicating an accumulated number of times when the question is displayed with respect to a predetermined total number of times allowed to question.

Also, for example, the second information may indicate an answering method with an answer example including text indicating a positive reaction and text indicating a negative reaction.

Also, for example, the second information may indicate an answering method with an answer example including a word allowing the target of the search to be narrowed down.

Also, for example, the target of the search may be a plurality of cooking recipes or menus, and the question may inquire about a request for the plurality of cooking recipes or menus.

Also, for example, the target of the search may be a plurality of travel plans, and the question may inquire about a request for the plurality of travel plans.

Also, for example, the target of the search may be a plurality of real estate properties, and the question may inquire about a request for the plurality of real estate properties.

Also, for example, the target of the search may be a plurality of video contents, and the question may inquire about a request for the plurality of video contents.

Also, for example, when the question is displayed, a first question for inquiring about the request for the plurality of cooking recipes or menus may be displayed in the first mode, a total number of the plurality of cooking recipes or menus included in a database may be displayed above the first question as the first information, and an answer example including a word indicating one food material or one classification included in the plurality of cooking recipes or menus based on the database may be displayed below the first question as the second information, after a first answer to the first question is acquired, a second question for further inquiring about the request for the plurality of cooking recipes or menus may be displayed in the first mode, a number of the plurality of cooking recipes or menus included in the database and acquired by narrowing-down with the first answer may be displayed above the second question as the first information, and an answer example including a word indicating one food material or one classification included in the plurality of cooking recipes or menus included in the database and acquired by narrowing-down with the first answer may be displayed below the second question as the second information, and in the database, the plurality of cooking recipes, classification information indicating a classification for each of the plurality of cooking recipes, and food material information indicating a food material for use in each of the plurality of cooking recipes may be associated with one another.

Also, for example, when the question is displayed, if the second answer to the second question includes a predetermined word, a third question for inquiring whether to request one classification included in the classification information or one food material included in the food material information may be further displayed in the first mode, a number of the plurality of cooking recipes or menus included in the database and acquired by narrowing-down with the second answer to the second question may be displayed above the third question as the first information, and an answer example including a word indicating a positive reaction to the one classification or the one food material and a word indicating a negative reaction may be displayed below the third question as the second information.

Also, for example, information about the plurality of cooking recipes or menus included in the database and acquired by narrowing-down with a third answer to the third question may be further displayed on the display if the third answer includes the word indicating the positive reaction and the number of the plurality of cooking recipes or menus included in the database and acquired by narrowing-down with the third answer is equal to or smaller than a threshold. When the question is displayed, if the number of the plurality of cooking recipes or menus included in the database and acquired by the third answer to the third question is not equal to or smaller than the threshold, a fourth question for inquiring whether to request a classification different from the one classification or a food material different from the one food material may be displayed in the first mode, a number of the plurality of cooking recipes or menus included in the database and acquired by narrowing-down with the third answer may be displayed above the fourth question as the first information, and an answer example including the word indicating the positive reaction and the word indicating the negative reaction may be displayed below the fourth question as the second information.

In an information processing apparatus according to one aspect of the present disclosure, display of a question and acquisition of an answer from a user to the question are repeated to narrow down information the user desires to make a search. The information processing apparatus includes an interaction controller which causes a question regarding a target of the search to be displayed in a first mode on a display included in a terminal and an input processor which causes an answer inputted from the user to the question to be acquired through the terminal. The interaction controller causes first information regarding a situation of a narrowing-down progress to be displayed above the question in a second mode and causes second information regarding a guide for answering the question to be displayed below the question in a third mode.

With this structure, interaction information as a reference can be presented as being distinguishable from a system utterance display. Thus, the user can easily input a response to a system utterance. This allows conditions regarding information the user desires to make a search to be fully acquired by interaction with the user.

These general and specific aspects may be implemented using a system, a method, an integrated circuit, a computer program, a computer-readable recording medium such as a CD-ROM, or any combination of systems, methods, integrated circuits, computer programs, and recording media.

In the following, an embodiment of the present disclosure is described with reference to the drawings. Each example in the embodiment described below is a merely specific example of the present disclosure, and numerical values, shapes, components, steps, and step sequences, and so forth described in the following embodiment are merely examples and are not meant to limit the present disclosure. Also, of the components in the following embodiment, a component not described in an independent claim representing a highest-order concept is described as an optional component. Also, any combination of these examples in the embodiment can be made.

Embodiment

In the following, an information processing method and others in the present embodiment is described.
[Information Processing System]
FIG. 1 is a schematic structural diagram of an information processing system according to the present embodiment.

The information processing system depicted in FIG. 1 includes an information processing apparatus 100 and a plurality of terminals including at least one of a terminal 200 and a terminal 300. The information processing apparatus 100 and the plurality of terminals are connected via a network 400.

The terminal 200 and the terminal 300 are an example of the plurality of terminals, and may be portable terminals such as smartphones, tablets, or portable phones or terminals for personal computers. The terminal 200 or the terminal 300 is used by a user, serving a function of input and output for interaction with the information processing apparatus 100. While two terminals are depicted in the example depicted in FIG. 1, this is not meant to be restrictive, and three or more terminals may be used.

The network 400 is a general-purpose network including the Internet, a wireless LAN, and so forth, relaying communications between the information processing apparatus 100 and the terminal 200 and others for connection.

The information processing apparatus 100 is implemented by a computer including a CPU, an input/output device, a communication device, and so forth, and is, for example, a server. The information processing apparatus 100 repeats display of a question and acquisition of an answer from the user to the question to narrow down information the user desires to make a search.

In the following, the structure of the information processing apparatus 100 is described.
[Structure of Information Processing Apparatus 100]
The information processing apparatus 100 depicted in FIG. 1 includes an input processor 11, an interaction controller 12, and a database 13.
<Input Processor 11>
The input processor 11 acquires an answer to a question inputted from the user through the terminal 200 or the like. In the present embodiment, the input processor 11 is controlled by the interaction controller 12, and outputs a comprehension result acquired by processing the user's interaction input and the user's interaction input itself to the interaction controller 12. An expression included in the answer acquired by the input processor 11 may vary depending on the user. However, by generally-known language comprehension technology, expressions with similar meaning are mapped into one label and can be comprehended as the same.

Interaction by the user may be displayed in a format of, for example, text or voice. Also, when the user provides an answer to a closed question, which will be described further below, the answer may be in a format of, in addition to the above, a line of sight or gesture.
<Interaction Controller 12>
The interaction controller 12 has a function of using the comprehension result outputted from the input processor 11 and the database 13 to determine an output sentence for interaction with the user such as a question to the user. Also, the interaction controller 12 has not only the function of determining an output sentence but also a function of managing the number of candidate pieces of information the user desires, that is, information the user desires to make a search, and managing information to be presented as an answer example by the user to the determined output sentence as management information. The interaction controller 12 outputs the output sentence into a display format for presentation to the user. This display format may be, for example, based on voice or text.

Figure 2:
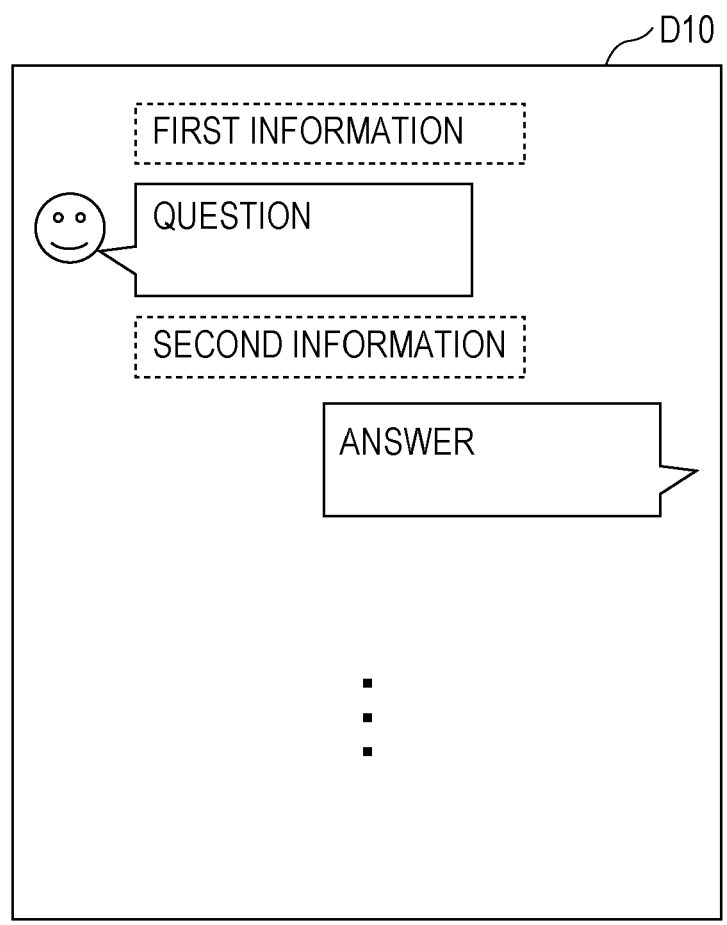
FIG. 2 is a diagram of a display mode of an information processing apparatus according to the embodiment.

FIG. 2 is a diagram of a display mode of the information processing apparatus 100 according to the present embodiment.

For example, as depicted in FIG. 2, the interaction controller 12 causes a question regarding a search target to be displayed in a first mode on, for example, a display screen D10 of a display included in the terminal 200 or the like, causes first information regarding a narrowing-down progress situation to be displayed above the question in a second mode, and causes second information regarding a guide for answering the question to be displayed below the question in a third mode.

Here, the question is displayed in the first mode, for example, as depicted in the display screen D10 of FIG. 2, in a rectangular frame region surrounded by a frame under predetermined specifications specified by display settings or the like. The question may be displayed in the first mode by displaying text indicating the question in the frame region surrounded by a frame in a balloon shape, a rectangular shape, or a corner-rounded rectangular shape under specification specified with a predetermined font, font size, text color, background color, or typeface.

Also, the first information may be any information regarding a situation of a narrowing-down progress. For example, the first information may be a number of search targets when the question is displayed. Also, for example, the first information may be a remaining number of a predetermined total number of times allowed to question when the question is displayed, or may be a degree of progress indicating an accumulated number of times when question is displayed with respect to the predetermined total number of times allowed to question.

The first information is displayed in the second mode, for example, in a dotted rectangular region outside and above the rectangular frame region surrounded by the frame in the display screen D10 of FIG. 2 under predetermined specifications. The first information may be displayed in the second mode by displaying text indicating the first information in the region outside and above the frame region under specifications specified with a predetermined font, font size, text color, background color, or typeface. As a matter of course, the specifications of the text indicating the question in the first mode and the specifications of the text indicating the first information in the second mode may be identical to or different from each other.

As the guide for answering the question, an answer example may be presented, or an answering method such as "Input with the button" may be specified. The second information may be any information regarding the guide for answering the question, and may indicate, for example, an answering method with an answer example including text indicating a positive reaction and text indicating a negative reaction. Also, for example, the second information may indicate an answering method with an answer example including a word allowing the search target to be narrowed down.

The second information is displayed in the third mode, for example, in a dotted rectangular region outside and below the rectangular frame region surrounded by the frame in the display screen D10 of FIG. 2 under predetermined specifications. The second information may be displayed in the third mode by displaying text indicating the second information in the region outside and below the frame region under specifications specified with a predetermined font, font size, text color, background color, or typeface. As a matter of course, the specifications of the text indicating the question in the first mode and the specifications of the text indicating the second information in the third mode may be identical to or different from each other. Also, specifications of the text indicating the first information in the second mode and the specifications of the text indicating the second information in the third mode may be identical to or different from each other.

Also, when a situation of the narrowing-down progress satisfies a predetermined condition, the interaction controller 12 causes information indicating a candidate for the search target acquired by the narrowing-down progress to be displayed on the display. Here, the predetermined condition is that a number of candidates for the search target is equal to or smaller than a predetermined number, for example.

Figure 3:
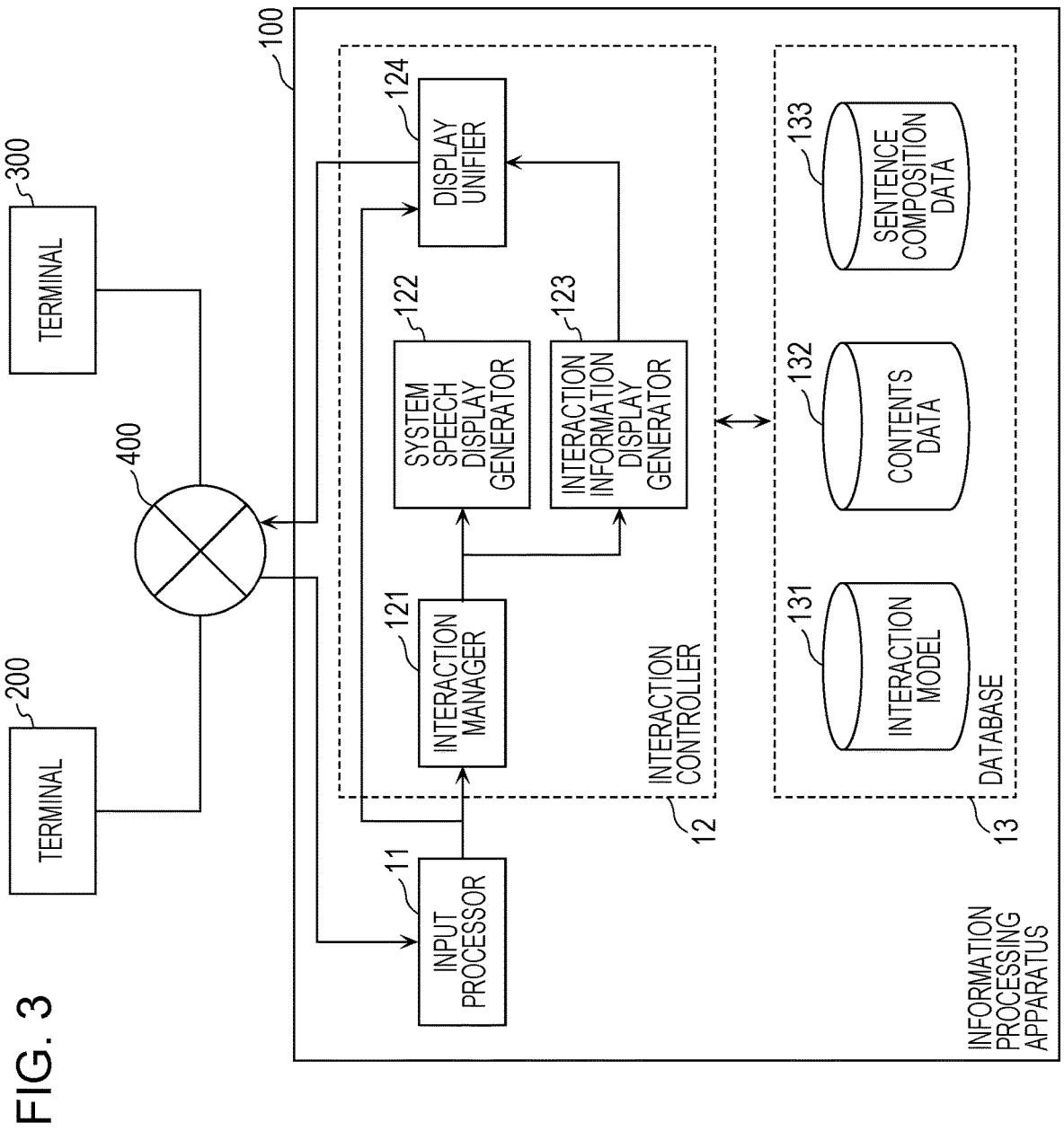
FIG. 3 is a diagram depicting a detailed structure of an interaction controller and a database according to the embodiment.

FIG. 3 is a diagram depicting a detailed structure of the interaction controller 12 and the database 13 according to the present embodiment. As depicted in FIG. 3, the interaction controller 12 includes an interaction manager 121, a system utterance display generator 122, an interaction information display generator 123, and a display unifier 124. The interaction controller 12 according to the present embodiment refers to an interaction model 131, contents data 132, and sentence generation data 133 included in the database 13 to narrow down information the user desires to make a search in coordination with the input processor 11.

<<Interaction Manager 121>>

The interaction manager 121 uses the comprehension results outputted from the input processor 11 and the database 13 to update the management information managed to display the first information and the second information, and also determines an output sentence for interaction with the user, such as a question to the user, that is, the action of the system.

More specifically, the interaction manager 121 follows, for example, an interactive state transition model stored in the interaction model 131 such as a state transition diagram, to update a current interactive state in accordance with the immediately-previous action of the system and the comprehension result outputted from the input processor 11 and, based on that, determines the action of the system. Here, determining the action of the system means that the information processing apparatus 100 or the interaction controller 12 determines a type of an output sentence such as, for example, "open question" or "closed question" and a keyword regarding the output sentence.

The management information is managed by the information processing apparatus 100 or the interaction controller 12, and may not be in a human-understandable format. In a task of narrowing down information the user desires to make a search from among information included in the contents data 132, the management information may include a number of narrowed-down information candidates from input history of the user. Also, when the interaction manager 121 pre-reads the state transition diagram to determine the action of the system and acquires also information about next-assumed input examples, the management information may include the information about the input examples. The management information is not limited to these, and may include information indicating a degree of progress, information indicating an upper limit of the number of times of questioning, and/or a hit count in a task of narrowing down information the user desires to make a search.

<<System Utterance Display Generator 122>>

The system utterance display generator 122 refers to the sentence generation data 133 based on the action of the system determined by the interaction manager 121 to generate a system utterance display indicating a question regarding a search target in the first mode.

More specifically, the system utterance display generator 122 acquires the action of the system determined by the interaction manager 121, refers to the sentence generation data 133 to convert the action of the system into a system utterance as a specific natural language expression such as a question sentence, and generates a utterance display for display in the first mode as, for example, being surrounded by a balloon.

<<Interaction Information Display Generator 123>>

The interaction information display generator 123 generates an interaction information display acquired by converting the management information managed by the interaction manager 121 into a format for presentation to the user.

More specifically, the interaction information display generator 123 refers to the management information managed by the interaction manager 121 to generate an interaction information display by converting the first information indicating, for example, the number of narrowed-down information candidates, into the second mode as a display format for brief presentation to the user and converting the second information indicating information regarding next-assumed input examples for the user into the third mode as a display format for brief presentation to the user.

<<Display Unifier 124>>

The display unifier 124 unifies the comprehension result outputted from the input processor 11, the user's interaction input itself, the system utterance display generated by the system utterance display generator 122, and the interaction information display generated by the interaction information display generator 123.

More specifically, the display unifier 124 generates a user utterance display in which the user's interaction input itself outputted from the input processor 11 is surrounded by a balloon. The display unifier 124 then unifies, that is, disposes, the generated user utterance display, the system utterance display generated by the system utterance display generator 122, and the interaction information display generated by the interaction information display generator 123 on the same display screen to generate a unified display. As described above, the display unifier 124 causes the first information such as the number of narrowed-down information candidates to be disposed above the system utterance and causes the second information such as next-assumed input examples for the user to be disposed below the system utterance.

<Database 13>

The database 13 is configured of, for example, a rewritable non-volatile memory such as a hard disk drive or solid state drive, storing information regarding a search target. More specifically, the interaction manager 121 refers to the database 13 to determine an interaction output and compose an output sentence.

In the present embodiment, as depicted in FIG. 3, the database 13 is configured of the interaction model 131, the contents data 132, and the sentence generation data 133.

<<Interaction Model 131>>

The interaction model 131 has stored therein, for example, an interactive state transition model represented in a form of a state transition diagram, and so forth. In the interaction model 131, a plurality of interactive states, actions of the system in the plurality of respective interactive states, and user responses are stored in association with one another. In the interaction model 131, the actions of the system are associated based on interactive states in accordance with the immediately-previous action of the system, and the comprehension result outputted from the input processor 11, and the interaction manager 121 refers to the interaction model 131.

<<Contents Data 132>>

The contents data 132 is an example of, for example, a knowledge base. For example, the contents data 132 is a database in which knowledge such as a relation between a plurality of candidates as a search target such as a relation between illnesses and subjective symptoms and element information (keywords) indicating a feature, attribute, condition, and so forth is described based on a specific representation format. For example, a plurality of candidates as a search target and classification information indicating classifications of the plurality of candidates, and element information configuring the plurality of candidates are stored in the contents data 132 in association with one another.

<<Sentence generation Data 133>>

The sentence generation data 133 is configured of, for example, a list of templates to be filled with a keyword to complete a sentence and conditions for applying the templates. More specifically, the sentence generation data 133 has stored therein a template of an open question which the interaction controller 12 refers to, a template of a closed question, a question template for acquiring knowledge, and a template for use to answer a user question.

[Process of Information Processing Apparatus 100]

Next, the process of the above-structured information processing apparatus 100 is described.

Figure 4:
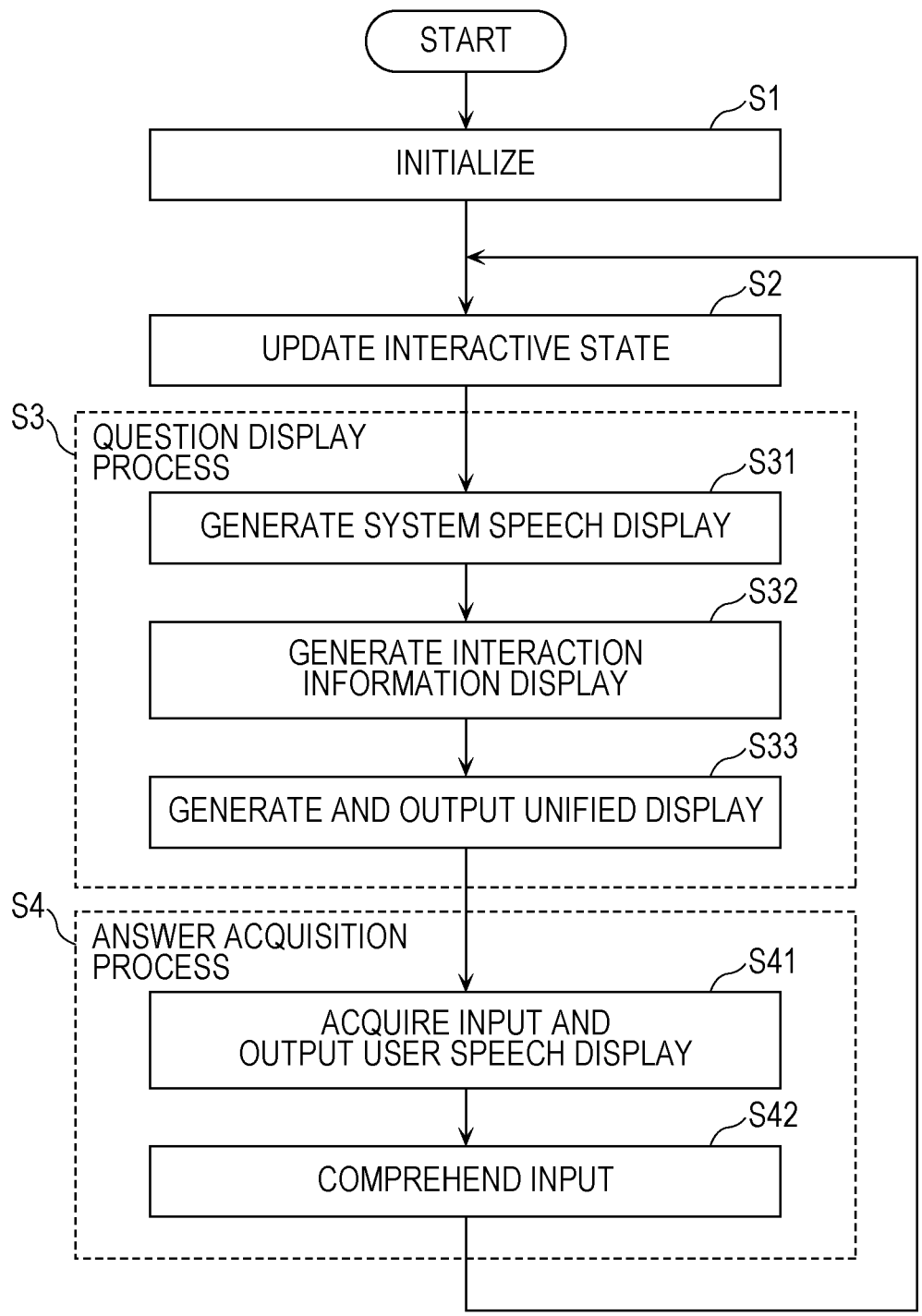
FIG. 4 is a flowchart of one example of the process of the information processing apparatus according to the embodiment.

FIG. 4 is a flowchart of one example of the process of the information processing apparatus according to the present embodiment.

First, the information processing apparatus 100 performs initialization (S1).

Next, the information processing apparatus 100 updates the interactive state based on initial conditions (S2).

Next, the information processing apparatus 100 performs a question display process including a process of causing a question regarding a search target to be displayed in the first mode on the display included in the terminal 200 or the like, causing the first information regarding a narrowing-down progress situation to be displayed above the question in the second mode, and causing the second information regarding a guide for answering the question to be displayed below the question in the third mode (S3).

More specifically, at step S3, the information processing apparatus 100 first generates, for example, a system utterance display indicating a question regarding a search target in the first mode (S31). Next, the information processing apparatus 100 generates an interaction information display for displaying the first information in the second mode and the second information in the third mode (S32). Next, the information processing apparatus 100 unifies, that is, disposes, the system utterance display generated at step S31 and the interaction information display generated at step S32 on the same display screen to generate and output a unified display for interaction with the user (S33).

Next, the information processing apparatus 100 performs an answer acquisition process including a process of acquiring an answer to the question inputted by the user (S4).

More specifically, at step S4, the information processing apparatus 100 first acquires, for example, an input from the user in response to the system utterance display included in the unified display outputted at step S3, and outputs the user utterance display for displaying the input (S41). Next, the information processing apparatus 100 comprehends the input from the user acquired at step S41 (S42).

Next, the information processing apparatus 100 returns to step S2 to update the interactive state based on the comprehension result of the user input and so forth and, similarly to the above, continues interaction with the user by proceeding to a loop from step S2 to step S4.

While step S32 is performed after step S31 in FIG. 4, this is not meant to be restrictive, and step S31 may be performed after step S32. That is, of these steps, it does not matter which step comes first.

[Example of Interaction Model 131]

Figure 5:
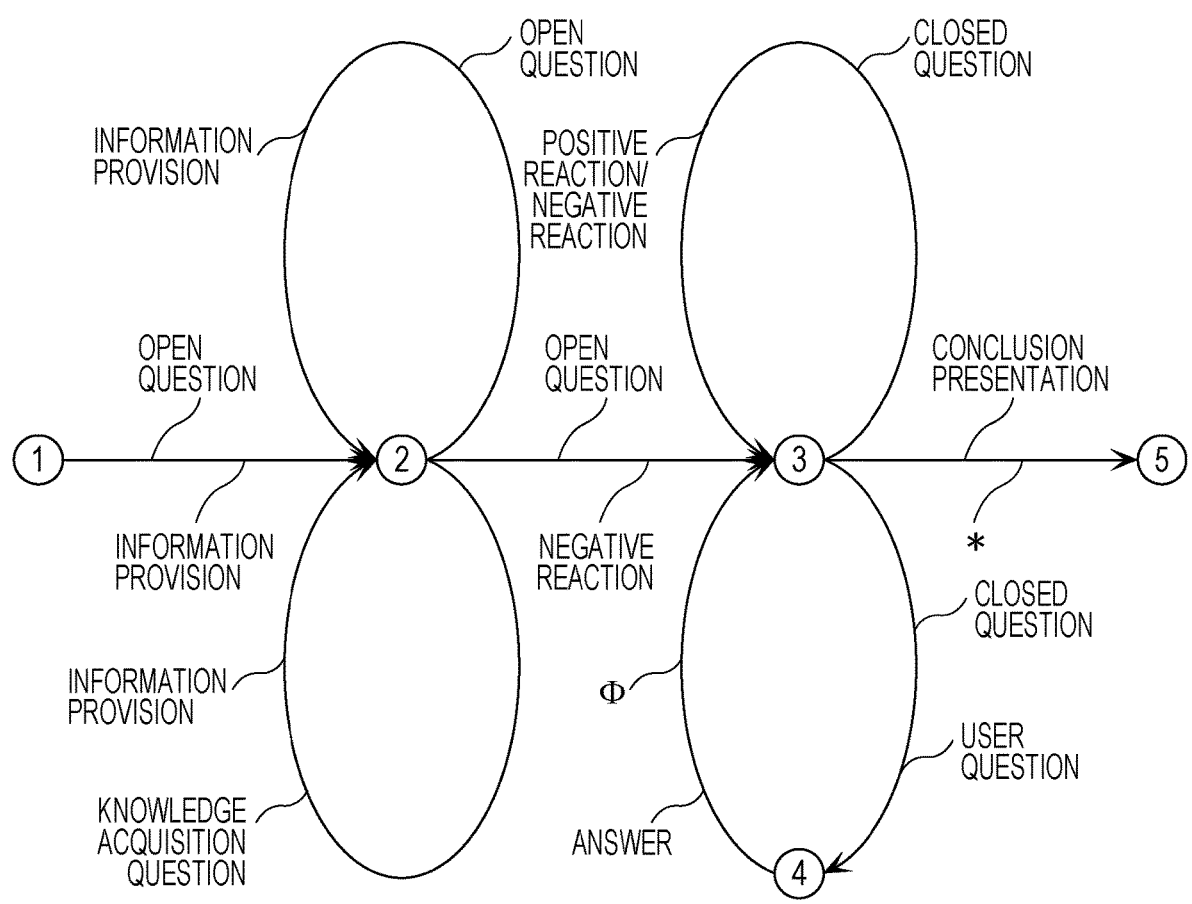
FIG. 5 is a diagram of one example of an interaction model according to the embodiment.

FIG. 5 is a diagram of one example of the interaction model 131 according to the present embodiment. FIG. 5 depicts an interaction state transition model represented in a form of a state transition diagram, as one example of the interaction model 131. In FIG. 5, an interaction state is represented by a state number surrounded by a circle, and a transition is represented by an arrow. On the arrow, two events are linked together. A action of the system is linked to the event near an arrow tail, and a action of the user is linked to the event near an arrow head. The action of the user corresponds to the comprehension result of the user input. State 1 represents that the interactive state of the information processing apparatus 100 is in an initial state, and State 5 represents that the interactive state of the information processing apparatus 100 is in a final state.

In State 1, when the information processing apparatus 100 makes an open question and the user provides information, the interactive state makes a transition to State 2.

In State 2, when the information processing apparatus 100 makes an open question and the user provides information or when the information processing apparatus 100 makes a knowledge acquisition question and the user provides information, the interactive state returns to State 2. Meanwhile, in State 2, when the information processing apparatus 100 makes an open question and the user provides a negative reaction, the interactive state makes a transition to State 3.

In State 3, when the information processing apparatus 100 makes a closed question and the user provides a positive or negative reaction, the interactive state returns to State 3. Also, when the information processing apparatus 100 makes a closed question and the user makes a user question, the interactive state makes a transition to State 4. Another transition in State 3 is made when the information processing apparatus 100 presents a conclusion. With any input from the user represented by "*", the interactive state makes a transition to State 5.

In State 4, when the information processing apparatus 100 makes an answer, the interactive state then returns to State 3 without waiting for a user input. Here, "Φ" depicted in FIG. 5 means a specific symbol representing an immediate transition.

When the interactive state is in a certain state and the number of actions to be taken by the information processing apparatus 100 is one, the information processing apparatus 100 takes this action. However, when a plurality of actions are set, the information processing apparatus 100 may select one based on a policy. In the example depicted in FIG. 5, for example, State 2 has two options, that is, an open question or a knowledge acquisition question. In this case, a policy as a rule for determining priorities is predetermined in which, for example, an open question is selected if information about a keyword provided immediately previously is known to the information processing apparatus 100, and a knowledge acquisition question is selected if the keyword is unknown to the information processing apparatus 100. Also, for example, State 3 has two options, that is, a closed question or conclusion presentation. In this case, a policy is predetermined in which, for example, conclusion presentation is selected if information the user desires is sufficiently narrowed down by a keyword acquired until immediately previously and, otherwise, a closed question is used to acquire information for further narrowing down information candidates. And, the policy is stored in the contents data 132. That is, when a plurality of actions are set in, for example, State 2, the information processing apparatus 100 refers to the policy defined in the contents data 132 for determination.

[Effects and Others]

As described above, in the information processing apparatus and others according to the present embodiment, by presenting interaction information as a reference as being distinguishable from the system utterance display, the user can easily input a response to the system utterance. This allows conditions regarding information the user desires to make a search to be fully acquired by interaction with the user.

While the system utterance is displayed as text or the like in the above description, this is not meant to be restrictive. When the information processing apparatus and others according to the present embodiment include a sound output unit, only text of the system utterance in the balloon may be read aloud.

Also, while the contents data 132 is described as being configured in the database 13 inside the information processing apparatus 100 in the above description, the contents data 132 may be configured on an external server, for example.

In the following, effects of the information processing apparatus and others according to the present embodiment are described by using FIG. 6 to FIG. 8. In each of FIG. 6 to FIG. 8, an example is depicted in which a task for narrowing down recipes satisfying a plurality of conditions is performed as a task for narrowing down information the user desires to make a search by interaction between the information processing apparatus 100 and the user.

Figure 6:
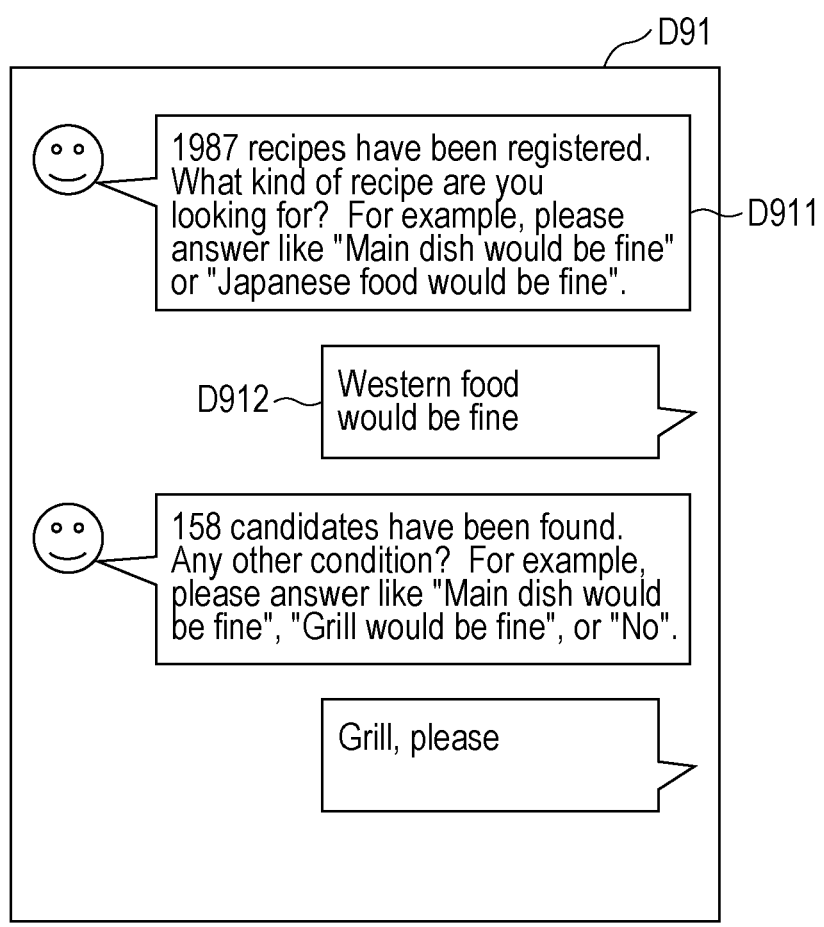
FIG. 6 is a diagram of one example of a display screen according to a comparative example.

FIG. 6 is a diagram of one example of a display screen D91 according to a comparative example. FIG. 6 depicts, as a comparative example, a display regarding interaction for four turns as the display screen D91 where messages from a chatbot and messages from human are presented in a unified manner.

On the display screen D91, a region D911 represents a system utterance region of a first turn, and a region D912 represents a user utterance region of a second turn. Either has a balloon frame, and has a colloquial expression in the utterance region.

Specifically, the region D911 has three sentences, that is, "1987 recipes have been registered.", "What kind of recipe are you looking for?", and "For example, please answer like "Main dish would be fine" or "Japanese food would be fine". The region D912 has a sentence "Western food would be fine", which is a response to the second sentence in the region D911. In the region D911, the first sentence is a descriptive sentence based on the management information managed by the system, and the second sentence is a question sentence to the user. The third sentence is a supplementary sentence based on the management information, and is supplementary to the second sentence. Of these three sentences, a main expression for interactive exchange with the user is the second sentence, that is, the question sentence, and the user is asked to answer this question sentence. Other two sentences are sub-expressions and are classified as supplementary information. In the region D911, however, these three sentences are aligned without distinction, and the question to be answered by the user is obscured. That is, it is difficult to understand which sentence the user should answer among these three sentences.

Conventionally, applications for chatting by text between humans and interaction between a human and a chatbot have been implemented on the same platform. That is, the chatbot puts its message as a mechanical output on the text-based platform for oral exchange between humans. Thus, as with a human input, the chatbot provides an output to a balloon. As depicted in FIG. 6, if a descriptive sentence regarding information managed by the machine and supplementary information such as usage managed by the machine are outputted out of kindness, main information is obscured, which makes it difficult for the user to answer instead.

In this manner, in the comparative example depicted in FIG. 6, as for the messages from the chatbot and the messages from the human, text in a balloon and so forth are presented in a unified mode. Thus, the information managed by the system is expressed entirely as lines of the chatbot and, for example, the question to be answered by the user may be obscured in the long lines. In this manner, a problem regarding ease of input by the user arises. As a result, the chatbot may not fully acquire, from the user, conditions regarding information the user desires to make a search.

Figure 7:
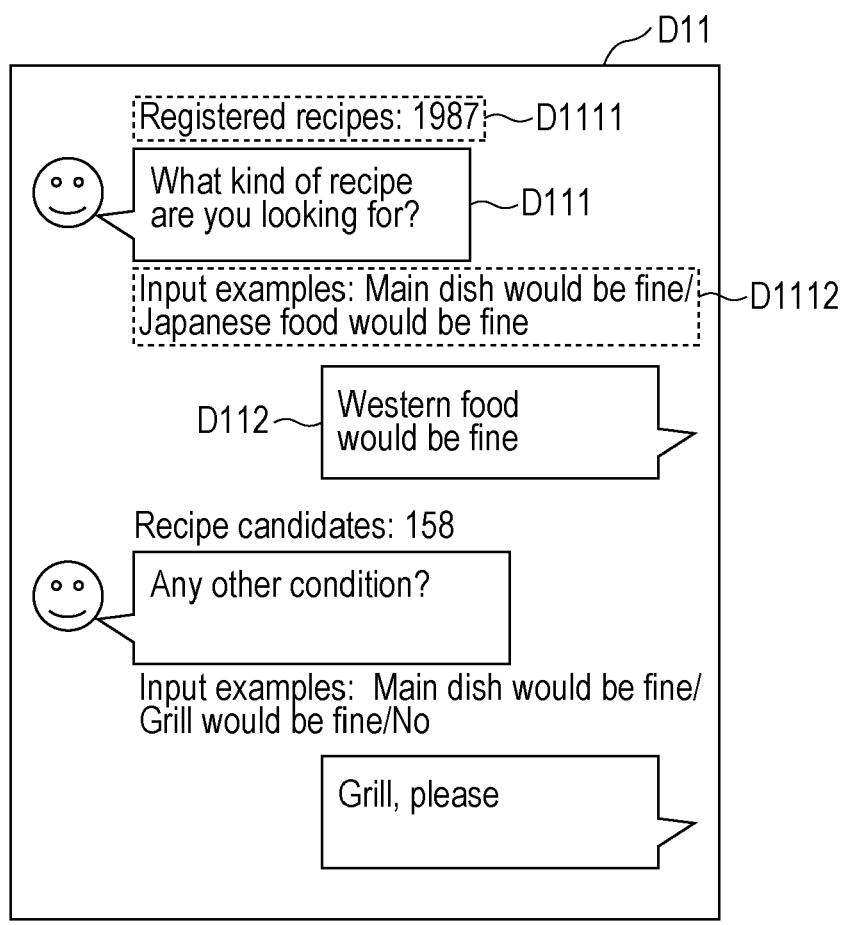
FIG. 7 is a diagram of one example of a display screen according to the embodiment.

FIG. 7 is a diagram of one example of a display screen D11 according to the present embodiment. FIG. 7 depicts a display regarding interaction for four turns as the display screen D11 according to the present embodiment.

On the display screen D11, a region D111 represents a utterance region of a first turn by the information processing apparatus 100 as a system, and is surrounded by a balloon-like frame. A region D112 is a user utterance region of a second turn, and is surrounded by a balloon-like frame.

A region D1111 is an interaction information display region disposed above the region D111, displaying the first information regarding a narrowing-down progress situation such as, for example, "Registered recipes: 1987". A region D1112 is an interaction information display region disposed below the region D111, displaying the second information regarding a guide for answering the question such as, for example, "Input examples: Main dish would be fine/Japanese food would be fine". While the region D1111 and the region D1112 are each surrounded by a dotted line for clarifying the region in FIG. 7, this dotted line can be omitted in actual display.

When the user is about to input an answer to the question from the information processing apparatus 100 to a utterance region represented by the region D112, the region D111, the first information in the region D1111 above the region D111, and the second information in the region D1112 below the region D111 are displayed. Thus, the user can easily know that an answer to the question in the utterance region represented by the region D111, "Western food would be fine", is to be inputted. The user can also easily understand that the first information displayed in the region D1111 and the second information displayed in the region D1112 are supplementary information to the question in the utterance region represented by the region D111.

Conventionally, auxiliary information such as time information is presented on a chat platform for humans, but is distinguished from interaction information, that is, the first information and the second information, presented to facilitate an interaction progress.

Figure 8:
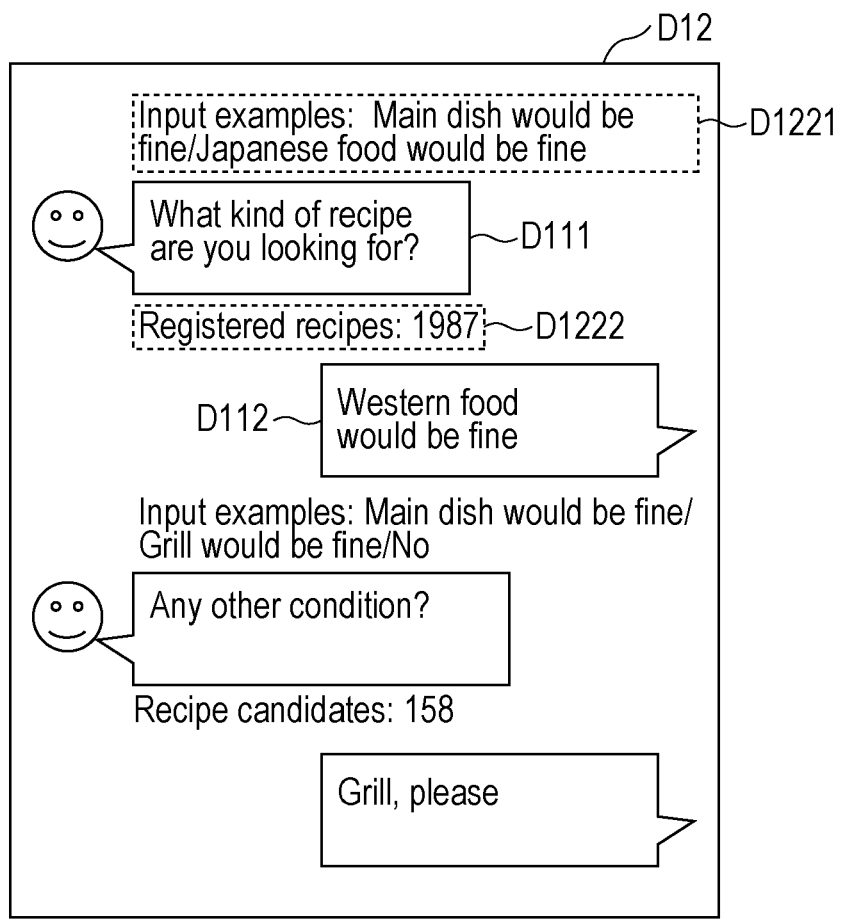
FIG. 8 is a diagram of a display screen according to a modification example of the embodiment.

FIG. 8 is a diagram of a display screen D12 according to a modification example of the present embodiment. An element similar to that of FIG. 7 is provided with the same reference character and is not described in detail herein. FIG. 8 depicts a display regarding interaction for four turns as the display screen D12 as the modification example of the display screen D11.

In contrast to the display screen D11 depicted in FIG. 7, the display screen D12 depicted in FIG. 8 has different contents displayed above and below the region D111.

More specifically, a region D1221 is an interaction information display region disposed above the region D111, displaying the second information regarding a guide for answering the question such as, for example, "Input examples: Main dish would be fine/Japanese food would be fine". A region D1222 is an interaction information display region disposed below the region D111, displaying the first information regarding a narrowing-down progress situation such as, for example, "Registered recipes: 1987". That is, the contents displayed on the interaction information display regions in FIG. 7 vertically change places.

However, on the display screen D12 according to the present modification example, it is not easy for the user to input the answer to the question in the utterance region represented by the region D111, "Western food would be fine". That is, the user may have difficulty in answering, because the user may desire to refer to the second information regarding a guide for answering the question such as input examples after the question from the information processing apparatus 100. Also, the first information regarding a narrowing-down progress situation managed by the information processing apparatus 100 is contrary to the causality of determining a system utterance, and may not serve as a reference for the user to answer the question from the information processing apparatus 100. As depicted on the display screen D12 according to the present modification example, the interaction information including the first information and the second information are briefly displayed on the interaction information display regions above and below the region D111, which has an effect of making each sentence distinctive, compared with the display screen D91 in the comparative example depicted in FIG. 6 where all three sentences are displayed in the region D911 as a utterance region. However, appropriate contents to be displayed above the region D111 and contents to be displayed below the region D111 are different.

As described above, a user utterance changes the interaction state, and a question or the like by the information processing apparatus 100 is thereby determined. Thus, the user can naturally refer to the first information regarding a narrowing-down progress situation as information regarding the interaction state if the first information is displayed on the interaction information display region above the region D111 as a utterance region. Meanwhile, the user can easily input an answer or the like and use the system with relief if the second information regarding a guide for answering the question as information about which user utterance to the question or the like by the information processing apparatus 100 is assumed by the information processing apparatus 100 is displayed on the interaction information display region below the region D111 as a utterance region.

As described above, if the management information such as an information hit count, which changes in response to a user utterance, is presented above the balloon of the system utterance, the user can easily understand that the interaction is progressing. Also, if the management information such as input examples for the user in inputting, which are waited for by the information processing apparatus 100, is presented below the balloon of the system utterance, the user can use this management information as a reference for embodying his or her own input. Also, this presentation serves a function of filling a gap between an input conceived by the user and an input waited for by the information processing apparatus 100.

As described above, in the information processing apparatus and others according to the present embodiment, by presenting interaction information as a reference as being distinguishable from the system utterance display, the user can easily input a response to the system utterance. This allows conditions regarding information the user desires to make a search to be fully acquired by interaction with the user.

In the following, specific aspects to narrow down information the user desires to make a search by interaction with user are described as examples.

First Example

In a first example, am example is described in which a task for narrowing down recipes satisfying a plurality of conditions is performed as a task for narrowing down information the user desires to make a search. That is, a case is described in which a search target is a plurality of cooking recipes or menus and a question inquires about a request for the plurality of cooking recipes or menus.

[Contents Data 132]

Figure 9:
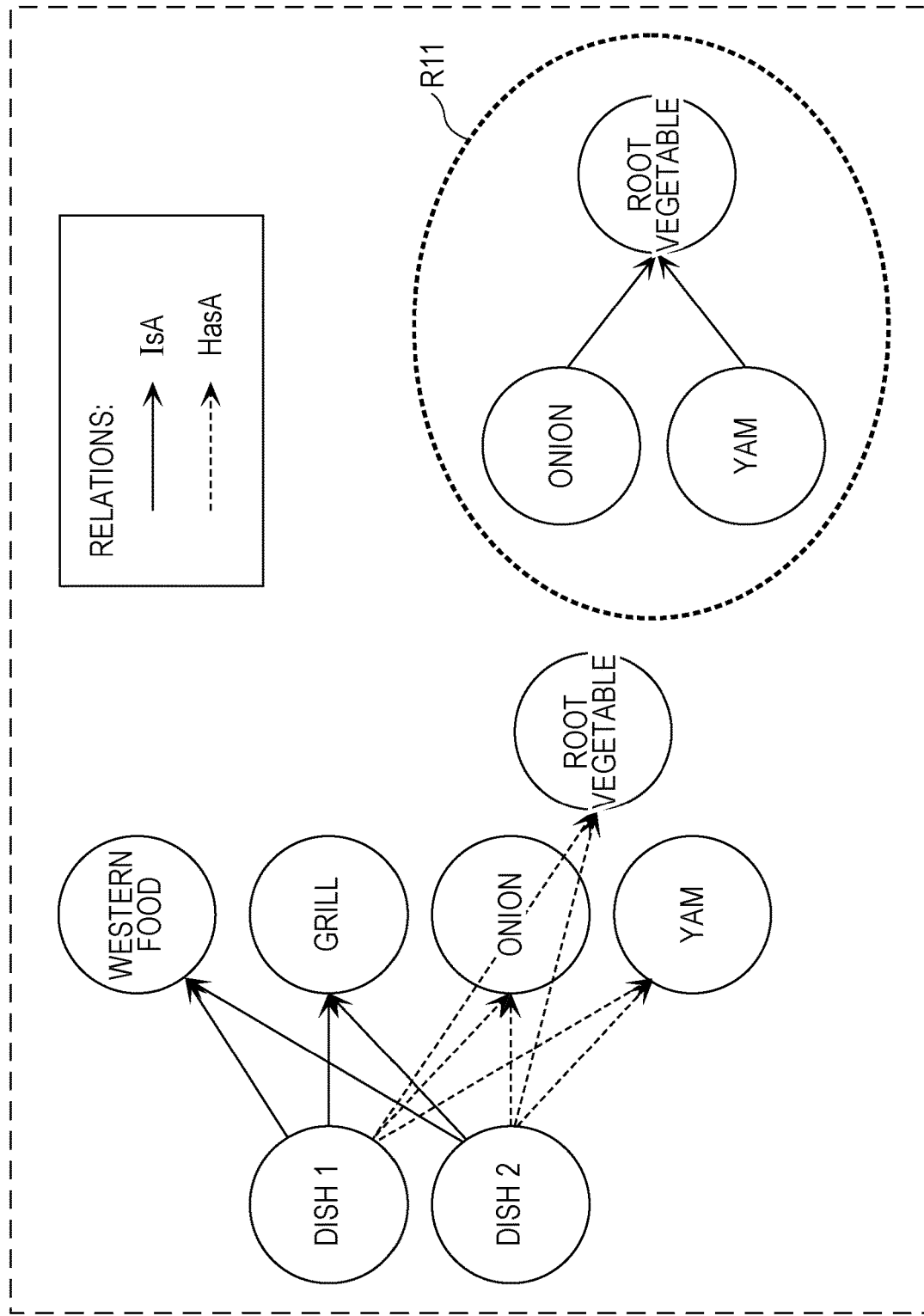
FIG. 9 is a diagram of one example of contents data according to a first example of the embodiment.

FIG. 9 is a diagram of one example of the contents data 132 according to the first example of the embodiment.

FIG. 9 depicts a knowledge base as one example of the contents data 132 in which a relation between dishes and their classification, a relation between dishes and food materials, and so forth are represented in a format of a directed graph. The diagram depicted in FIG. 9 corresponds to an example illustrating part of a huge knowledge base. In other words, the contents data 132 has a plurality of cooking recipes, classification information indicating a classification for each of the plurality of cooking recipes, and food material information indicating food materials for use for each of the plurality of cooking recipes in association with one another.

In general, in a directed graph representing knowledge, a circle is called a node, and an arrow is called an edge. A triad with one node and another node connected via an edge is called a triple. A concept is connected to a node, and two concepts are connected via an edge (line segment), and a relation between the concepts represented by a triple forms a unit of knowledge.

In the example depicted in FIG. 9, dish 1 and dish 2 correspond to a plurality of candidates for a search target; and Western food, grill, onion, and so forth correspond to element information (keywords) indicating a feature, attribute, condition, or the like. Also in FIG. 9, for example, a relation is indicated in which dish 1 and dish 2 at node 1 are one type of Western foods and also one type of grills. Also, a relation is indicated in which onion and yam at node 2 are used as materials for dish 1 and dish 2 at node 1. Furthermore, a relation is indicated in which root vegetable, which is a highest-order concept of onion and yam, is also a material for dish 1 and dish 2. To represent these relations, two types of relative, "IsA" and "HasA", are applied.

Therefore, by taking node 2 in [node 1 IsA node 2] or [node 1 HasA node 2] as a keyword and taking node 1 connected to node 2 as a search target, keywords for AND search of a plurality of keywords are increased to allow information satisfying a plurality of conditions to be narrowed down.

Also, an oval region R11 indicated by a dotted line represents a relation between food materials and classifications. The region R11 is one example of knowledge for use in answering a user question when the user is assumed not to have knowledge about "root vegetable". The region R11 is not directly referred to for cooking search, and is thus provided as a separate frame.

[Sentence Generation Data 133]

FIG. 10 is a diagram of one example of sentence generation data 133 according to the first example of the present embodiment. FIG. 10 exemplarily depicts templates of an open question, closed question, knowledge acquisition question, and answer for reference by the information processing apparatus 100 and their application conditions.

That is, when outputting an open question regarding a search target, at the time of starting interaction with the user, the information processing apparatus 100 composes a first open question depicted in FIG. 10 "What kind of recipe are you looking for?", and then (repeatedly) composes a second and onward open question depicted in FIG. 10 "Any other condition?".

Also, when outputting a closed question regarding a search target, by taking a relation between a keyword (node 2) and a search target (node 1) specified by the interaction manager 121 as being IsA or HasA as a condition, the information processing apparatus 100 uses a template depicted in FIG. 10 to output a closed question. For IsA, the information processing apparatus 100 uses a template of the closed question depicted in FIG. 10 "Would (node 2) be fine?" to output a closed question. For HasA, the information processing apparatus 100 uses a template of the closed question depicted in FIG. 10 "Would (node 2) be fine for use?" to output a closed question.

Also, when outputting a knowledge acquisition question, the information processing apparatus 100 always outputs a question sentence "For example, what kind of dish?" to ask the user to exemplarily provide desired information.

Also, when the information processing apparatus 100 outputs an answer to a user question which is a WHAT question regarding "X" and a relation "Y" IsA "X" is found in the contents data 132 as a knowledge base, the information processing apparatus 100 uses a template of the answer depicted in FIG. 10 "For example, list_up("Y")." to output an answer. Here, list_up("Y") in the template represents that when a plurality of pieces of knowledge ["Y" IsA "X"] in the condition are found for "X", those corresponding to "Y" are listed up and concatenated via ",". If the number of pieces of knowledge is large, an appropriate number of them may be used.

Also, when the information processing apparatus 100 outputs an answer to a user question which is a WHAT question regarding "X" and a relation "X" IsA "Z" is found in the contents data 132 as a knowledge base, the information processing apparatus 100 uses another template of the answer "This is a kind of "Z"." to output an answer. That is, in accordance with the relation in the contents data 132 as a knowledge base, the information processing apparatus 100 composes an answer such as "For example, Y1, Y2" or "This is a kind of Z".

Although not depicted, to compose input examples assumed as a user input, a template may be provided in the sentence generation data 133. For example, an information provision template "(keyword) would be fine.", a positive answer template "Yes", and a negative answer template "No" may be stored in the sentence generation data 133.

[Process of Information Processing Apparatus 100]

Figure 11:
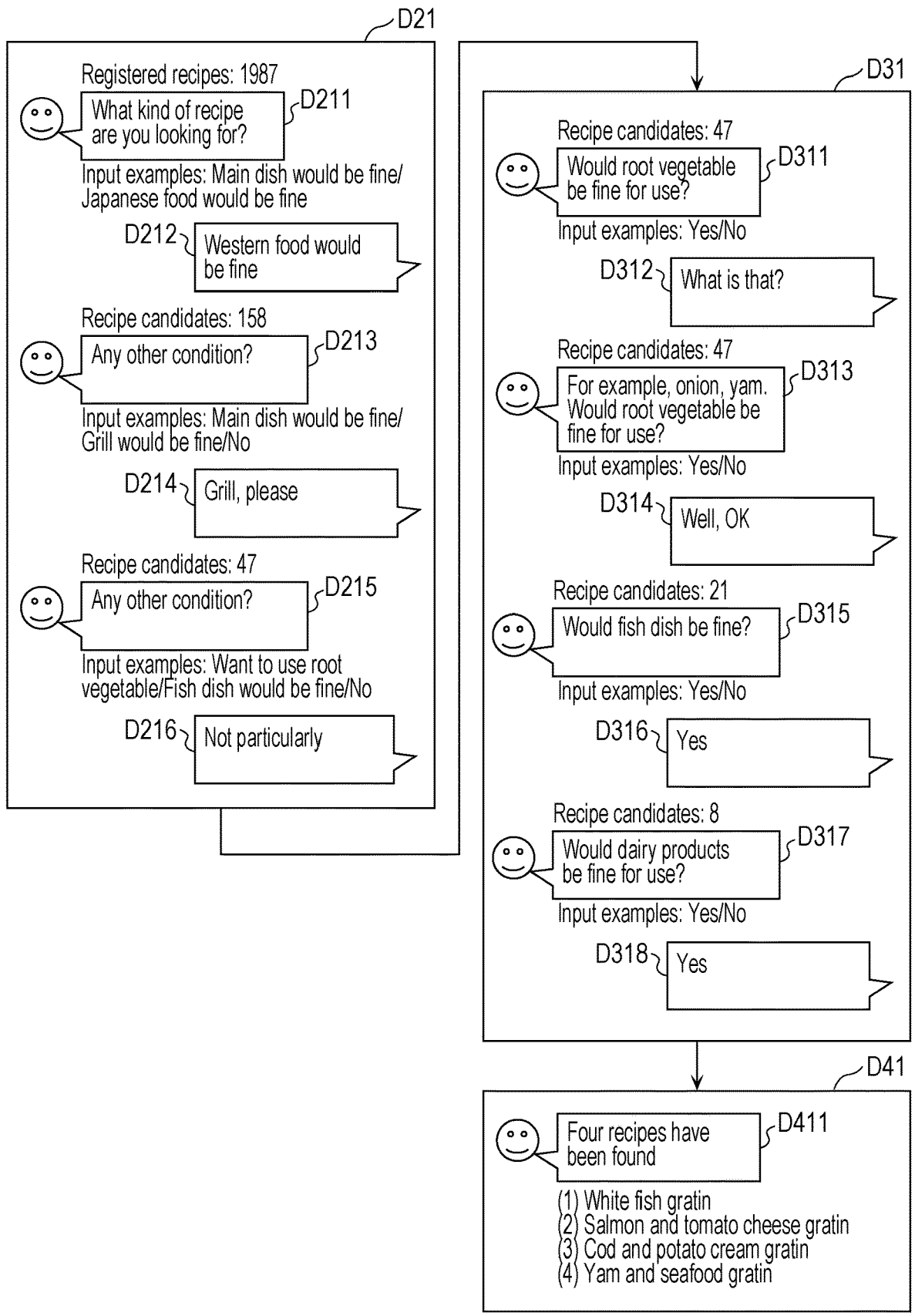
FIG. 11 is a diagram of one example of a display screen according to the first example of the embodiment.

FIG. 11 is a diagram of one example of a display screen according to the first example of the present embodiment.

A display screen D21 represents one example of interaction when the information processing apparatus 100 makes an open question. A display screen D31 represents one example of interaction when the information processing apparatus 100 makes a closed question. A display screen D41 represents one example of a screen displayed when the information processing apparatus 100 presents a conclusion.

In the following, description is made along the process described in FIG. 4 and FIG. 5.

In an initial state, that is, in State 1 of FIG. 5, the number of candidates for a plurality of recipes or menus as a search target, that is, registered pieces of recipe information, is assumed to be 1987.

<First Turn and Second Turn>

First, the information processing apparatus 100 performs the question display process at step S3. Specifically, the information processing apparatus 100 first refers to the interaction model 131 of FIG. 5 to determine to make an open question because the state is in an initial state, that is, State 1, and then refers to the sentence generation data 133 of FIG. 10 to generate a system utterance display indicating a first open question "What kind of recipe are you looking for?". Here, the next input indicated in State 1 of FIG. 5 is assumed to be information provision. Next, the information processing apparatus 100 refers to the contents data 132 of FIG. 9 to extract "main dish" and "Japanese food" as candidates for keywords for narrowing down the recipe information candidates and generate an interaction information display for displaying input examples "Main dish would be fine" and "Japanese food would be fine".

As a result, on the display screen D21, as a first turn, the question "What kind of recipe are you looking for?" is displayed in a region D211, first information "Registered recipes: 1987" is displayed in a region outside and above the region D211, and second information "Input examples: Main dish would be fine/Japanese food would be fine" is displayed in a region outside and below the region D211, each in a suitable mode. In this manner, while the question "What kind of recipe are you looking for?" is expressed in spoken language, the first information "Registered recipes: 1987" and the second information "Input examples: Main dish would be fine/Japanese food would be fine" are briefly expressed by using symbols.

Next, the information processing apparatus 100 performs the answer acquisition process at step S4. Specifically, the information processing apparatus 100 first acquires an input from the user "Western food would be fine", and causes the input to be displayed as it is in a region D212 as a second turn on the display screen D21. When comprehending the answer from the user as information provision depicted in FIG. 5, the information processing apparatus 100 further extracts a keyword "Western food".

Next, the information processing apparatus 100 updates the interactive state at step S2. Specifically, the information processing apparatus 100 refers to the interaction model 131 depicted in FIG. 5, in which information provision is inputted when an open question is outputted in State 1, and thus determines that the interactive state makes a transition from State 1 to State 2, and updates the interactive state.

<Third Turn and Fourth Turn>

Subsequently, the information processing apparatus 100 performs the process at step S3 and step S4 again.

First, the information processing apparatus 100 refers to FIG. 5 to determine to make an open question because the state is in State 2, and then refers to FIG. 10 to generate a system utterance display indicating a second open question "Any other condition?". Here, the next input indicated in the open question in State 2 of FIG. 5 is assumed to be information provision or a negative reaction.

Next, the information processing apparatus 100 generates an interaction information display for displaying 158 candidates acquired by narrowing down the recipe information candidates with only the keyword "Western food". Also, the information processing apparatus 100 refers to FIG. 9 to extract "main dish" and "grill" as keyword candidates for narrowing down the recipe information candidates and generate an interaction information display for displaying input examples "Main dish would be fine", "Grill would be fine", and "No".

As a result, on the display screen D21, as a third turn, the question "Any other condition?" is displayed in a region D213, first information "Recipe candidates: 158" is displayed in a region outside and above the region D213, and second information "Input examples: Main dish would be fine/Grill would be fine/No" is displayed in a region outside and below the region D213, each in a suitable mode.

Next, the information processing apparatus 100 acquires an input from the user "Grill, please", and causes the input to be displayed as it is in a region D214 as a fourth turn on the display screen D21. When comprehending the answer from the user as information provision depicted in FIG. 5, the information processing apparatus 100 further extracts a keyword "grill".

Next, the information processing apparatus 100 updates the interactive state at step S2. Specifically, the information processing apparatus 100 refers to FIG. 5, in which information provision is inputted when an open question is outputted in State 2, and thus determines that the interactive state stays at State 2.

<Fifth Turn and Sixth Turn>

Subsequently, the information processing apparatus 100 performs the process at step S3 and step S4 again.

First, the information processing apparatus 100 refers to FIG. 5 to determine to make an open question because the state is in State 2, and then refers to FIG. 10 to make a third open question and generate a system utterance display indicating "Any other condition?". Here, the next input indicated in the open question in State 2 of FIG. 5 is assumed to be information provision or a negative reaction.

Next, the information processing apparatus 100 generates an interaction information display for displaying 47 candidates acquired by narrowing down the recipe information candidates with the keywords "Western food" and "grill". Also, the information processing apparatus 100 refers to FIG. 9 to extract "root vegetable" and "fish dish" as keyword candidates for narrowing down the recipe information candidates and generate an interaction information display for displaying input examples "Want to use root vegetable", "Fish dish would be fine", and "No".

As a result, on the display screen D21, as a fifth turn, the question "Any other condition?" is displayed in a region D215, first information "Recipe candidates: 47" is displayed in a region outside and above the region D215, and second information "Input examples: Want to use root vegetable/Fish dish would be fine/No" is displayed in a region outside and below the region D215, each in a suitable mode.

Next, the information processing apparatus 100 acquires an input from the user "Not particularly", and causes the input to be displayed as it is in a region D216 as a sixth turn on the display screen D21. The information processing apparatus 100 comprehends the answer from the user as a negative reaction depicted in FIG. 5.

Next, the information processing apparatus 100 updates the interactive state at step S2. Specifically, the information processing apparatus 100 refers to FIG. 5, in which a negative reaction is inputted when an open question is outputted in State 2, and thus determines that the interactive state makes a transition from State 2 to State 3, and updates the interactive state.

<Seventh Turn and Eighth Turn>

Subsequently, the information processing apparatus 100 performs the process at step S3 and step S4 again. While narrowing down the information is performed based on open questions so far, but based on closed questions from now on. When the pieces of recipe information are narrowed down to four or less, interaction ends.

First, the information processing apparatus 100 refers to FIG. 5 to determine to make a closed question because the state is in State 3. Here, it is assumed that the information processing apparatus 100 refers to FIG. 9 and extracts a keyword "root vegetable" for narrowing down the recipe information candidates. In this case, as depicted in FIG. 9, a relative between "root vegetable" and dishes is "HasA". Thus, the information processing apparatus 100 refers to FIG. 10 and uses the template "Would "X" be fine for use?" to generate a system utterance display indicating a closed question "Would root vegetable be fine for use?". Here, the next input indicated in the closed question in State 3 of FIG. 5 is assumed to be a positive reaction or a negative reaction. Also, the keywords are not increased in the previous sixth turn, and thus the number of recipe information candidates stays at 47.

Next, the information processing apparatus 100 generates an interaction information display for displaying 47 recipe information candidates and an interaction information display for displaying input examples "Yes" and "No".

As a result, on the display screen D31, as a seventh turn, the question "Would root vegetable be fine for use?" is displayed in a region D311, first information "Recipe candidates: 47" is displayed in a region outside and above the region D311, and second information "Input examples: Yes/No" is displayed in a region outside and below the region D311, each in a suitable mode.

Next, the information processing apparatus 100 acquires an input from the user "What is that?", and causes the input to be displayed as it is in a region D312 as an eighth turn on the display screen D31. The information processing apparatus 100 comprehends the answer from the user as a user question (WHAT question) depicted in FIG. 5.

Next, the information processing apparatus 100 updates the interactive state at step S2. Specifically, the information processing apparatus 100 refers to FIG. 5, in which a user question is inputted when a closed question is outputted in State 3, and thus determines that the interactive state makes a transition from State 3 to State 4, and updates the interactive state.

<Ninth Turn and Tenth Turn>

Next, the information processing apparatus 100 performs the question display process at step S3. Specifically, the information processing apparatus 100 refers to FIG. 5 to determine to make an answer because the state is in State 4. Here, the information processing apparatus 100 refers to the region R11 of FIG. 9 and FIG. 10 and uses a template "For example, list_up("Y")." to generate a system utterance display indicating an answer "For example, onion, yam". Here, the next input indicated in the answer in State 4 of FIG. 5 is assumed to be "Φ". Thus, the information processing apparatus 100 determines that the interactive state makes a transition to State 3 as it is, and updates the interactive state.

Next, the information processing apparatus 100 refers to FIG. 5 to determine to make a closed question because the state is in State 3. Here, the keyword for narrowing down the recipe information candidates is still "root vegetable". Thus, the information processing apparatus 100 generates a system utterance display indicating a closed question identical to that in the seventh turn "Would root vegetable be fine for use?". Here, as described above, the next input indicated in the open question in State 3 of FIG. 5 is assumed to be a positive reaction or a negative reaction, and the keywords are not increased also in the previous turn. Thus, the number of recipe information candidates stays at 47. Thus, the information processing apparatus 100 generates an interaction information display for displaying 47 recipe information candidates and an interaction information display for displaying input examples "Yes" and "No".

As a result, on the display screen D31, as a ninth turn, an answer and a question "For example, onion, yam. Would root vegetable be fine for use?" is displayed in a region D313, first information "Recipe candidates: 47" is displayed in a region outside and above the region D313, and second information "Input examples: Yes/No" is displayed in a region outside and below the region D313, each in a suitable mode.

Next, the information processing apparatus 100 acquires an input from the user "Well, OK", and causes the input to be displayed as it is in a region D314 as a tenth turn on the display screen D31. The information processing apparatus 100 comprehends the answer from the user as a positive reaction depicted in FIG. 5.

Next, the information processing apparatus 100 updates the interactive state at step S2. Specifically, the information processing apparatus 100 refers to FIG. 5, in which a positive reaction is inputted when a closed question is outputted in State 3, and thus determines that the interactive state stays at State 3.

<Eleventh Turn and Twelfth Turn>

Subsequently, the information processing apparatus 100 performs the process at step S3 and step S4 again.

First, the information processing apparatus 100 refers to FIG. 5 to determine to make a closed question because the state is in State 3. Here, it is assumed that the information processing apparatus 100 extracts a keyword "fish dish" (not depicted) for narrowing down the recipe information candidates. In this case, the information processing apparatus 100 refers to FIG. 10 and uses the template "Would "X" be fine?" to generate a system utterance display indicating a closed question "Would fish dish be fine?". Here, the next input indicated in the closed question in State 3 of FIG. 5 is assumed to be a positive reaction or a negative reaction. Also, it is assumed that, with the keywords "Western food", "grill", and "root vegetable", the recipe information candidates are assumed to be narrowed down to 21.

Next, the information processing apparatus 100 generates an interaction information display for displaying 21 recipe information candidates and an interaction information display for displaying input examples "Yes" and "No".

As a result, on the display screen D31, as an eleventh turn, the question "Would fish dish be fine?" is displayed in a region D315, first information "Recipe candidates: 21" is displayed in a region outside and above the region D315, and second information "Input examples: Yes/No" is displayed in a region outside and below the region D315, each in a suitable mode.

Next, the information processing apparatus 100 acquires an input from the user "Yes", and causes the input to be displayed as it is in a region D316 as a twelfth turn on the display screen D31. The information processing apparatus 100 comprehends the answer from the user as a positive reaction depicted in FIG. 5.

Next, the information processing apparatus 100 updates the interactive state at step S2. Specifically, the information processing apparatus 100 refers to FIG. 5, in which a positive reaction is inputted when a closed question is outputted in State 3, and thus determines that the interactive state stays at State 3.

<Thirteen Turn and Fourteenth Turn>

Subsequently, the information processing apparatus 100 performs the process at step S3 and step S4 again.

First, the information processing apparatus 100 refers to FIG. 5 to determine to make a closed question because the state is in State 3. Here, it is assumed that the information processing apparatus 100 extracts a keyword "dairy products" (not depicted) for narrowing down the recipe information candidates. In this case, the information processing apparatus 100 refers to FIG. 10 and uses the template "Would "X" be fine for use?" to generate a system utterance display indicating a closed question "Would dairy products be fine for use?". Here, the next input indicated in the closed question in State 3 of FIG. 5 is assumed to be a positive reaction or a negative reaction. Also, it is assumed that, with the keywords "Western food", "grill", "root vegetable", and "fish food", the recipe information candidates are narrowed down to 8.

Next, the information processing apparatus 100 generates an interaction information display for displaying 8 recipe information candidates and an interaction information display for displaying input examples "Yes" and "No".

As a result, on the display screen D31, as a thirteenth turn, the question "Would dairy products be fine for use?" is displayed in a region D317, first information "Recipe candidates: 8" is displayed in a region outside and above the region D317, and second information "Input examples: Yes/No" is displayed in a region outside and below the region D317, each in a suitable mode.

Next, the information processing apparatus 100 acquires an input from the user "Yes", and causes the input to be displayed as it is in a region D318 as a fourteenth turn on the display screen D31. The information processing apparatus 100 comprehends the answer from the user as a positive reaction depicted in FIG. 5.

Next, the information processing apparatus 100 updates the interactive state at step S2. Specifically, the information processing apparatus 100 refers to FIG. 5, in which a positive reaction is inputted when a closed question is outputted in State 3, and thus determines that the interactive state stays at State 3.

<Fifteenth Turn>

Subsequently, the information processing apparatus 100 performs the process at step S3.

Here, with the keywords "Western food", "grill", "root vegetable", "fish food", and "dairy products", the recipe information candidates are narrowed down to four.

In this case, the information processing apparatus 100 refers to FIG. 5 to determine that the state is in State 3 and the number of recipe information candidates is four or less, and thus determines to present a conclusion. Although a template for conclusion presentation has not been described, such a template may be stored in the sentence generation data 133 of FIG. 10.

The information processing apparatus 100 refers to FIG. 10 and captures the number of recipe information candidates to generate a system utterance display indicating, for example, "Four recipes have been found".

As a result, on a display screen D41, as a fifteenth turn, a conclusion presentation "Four recipes have been found" is displayed in a region D411, and a list of four recipe information candidates acquired by narrowing down, that is, found recipes, is displayed in a region outside and below the region D411.

Next, the information processing apparatus 100 updates the interactive state at step S2. Specifically, the information processing apparatus 100 refers to FIG. 5 to determine that the interactive state makes a transition from State 3 to State 5 when a conclusion presentation is outputted in State 3 and any input is acquired from the user, and updates the interactive state.

[Effects and Others]

As described above, in the information processing apparatus and others according to the present example, the step of causing the question to be displayed includes a first step of causing a first question for inquiring about the request for the plurality of cooking recipes or menus to be displayed in a first mode, causing a total number of the plurality of cooking recipes or menus included in the database 13 to be displayed above the first question as the first information, and causing an answer example including a word indicating one food material or one classification included in the plurality of cooking recipes or menus based on the database 13 to be displayed below the first question as the second information, and a second step of causing, after a first answer to the first question is acquired in the step of acquiring the answer, a second question for further inquiring about the request for the plurality of cooking recipes or menus to be displayed in the first mode, causing the number of the plurality of cooking recipes or menus included in the database 13 and acquired by narrowing-down with the first answer to be displayed above the second question as the first information, and causing an answer example including a word indicating one food material or one classification included in the plurality of cooking recipes or menus included in the database 13 and acquired by narrowing-down with the first answer to be displayed below the second question as the second information. Here, in the database 13, the plurality of cooking recipes, classification information indicating a classification for each of the plurality of cooking recipes, and food material information indicating a food material for use in each of the plurality of cooking recipes are associated with one another.

Also, in the information processing apparatus and others according to the present example, in the step of causing the question to be displayed, if the second answer to the second question acquired in the step of causing the answer to be acquired includes a predetermined word, a third question for inquiring whether to request one classification included in the classification information or one food material included in the food material information is further displayed in the first mode, the number of the plurality of cooking recipes or menus included in the database 13 and acquired by narrowing-down with the second answer to the second question acquired in the step of causing the answer to be acquired is displayed above the third question as the first information, and an answer example including a word indicating a positive reaction to the one classification or the one food material and a word indicating a negative reaction is displayed below the third question as the second information.

Furthermore, the information processing apparatus and others according to the present example further includes a step of causing information about the plurality of cooking recipes or menus included in the database 13 and acquired by narrowing-down with a third answer to the third question acquired in the step of causing the answer to be acquired to be displayed on the display if the third answer includes the word indicating the positive reaction and the number of the plurality of cooking recipes or menus included in the database 13 and acquired by narrowing-down with the third answer is equal to or smaller than a threshold. In the step of causing the question to be displayed, if the number of the plurality of cooking recipes or menus included in the database 13 and acquired by the third answer to the third question acquired in the step of causing the answer to be acquired is not equal to or smaller than the threshold, a fourth question for inquiring whether to request a classification different from the one classification or a food material different from the one food material is displayed in the first mode, the number of the plurality of cooking recipes or menus included in the database 13 and acquired by narrowing-down with the third answer is displayed above the fourth question as the first information, and an answer example including the word indicating the positive reaction and the word indicating the negative reaction is displayed below the fourth question as the second information.

In this manner, in the information processing apparatus and others according to the present example, by presenting interaction information as a reference as being distinguishable from the system utterance display, the user can easily input a response to the system utterance. This allows conditions regarding information the user desires to make a search to be fully acquired by interaction with the user.

Second Example

In a second example, an example is described in which a task for narrowing down travel plans satisfying a plurality of conditions is performed as a task for narrowing down information the user desires to make a search. That is, a case is described in which a search target is a plurality of travel plans and a question inquires about a request for the plurality of travel plans.

[Contents Data 132]

Figure 12:
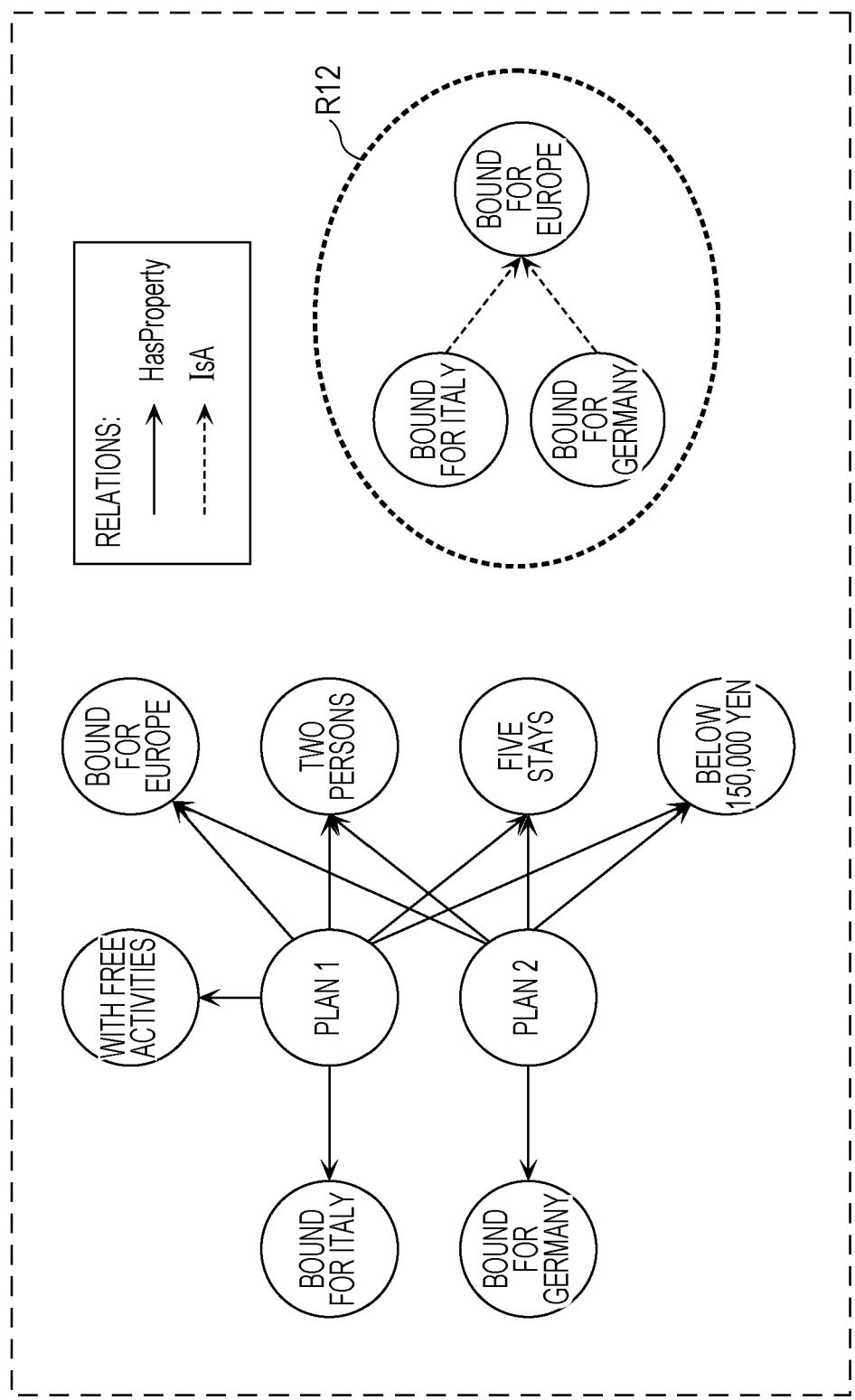
FIG. 12 is a diagram of one example of contents data according to a second example of the embodiment.

FIG. 12 is a diagram of one example of the contents data 132 according to the second example of the present embodiment.

FIG. 12 depicts a knowledge base as one example of the contents data 132 in which a relation between travel plans and conditions is represented in a format of a directed graph. The diagram depicted in FIG. 12 corresponds to an example illustrating part of a huge knowledge base.

In the example depicted in FIG. 12, plan 1 and plan 2 correspond to a plurality of candidates for a search target; and conditions such as "bound for Italy" and two persons correspond to element information (keywords) indicating a feature, attribute, condition, or the like. Also in FIG. 12, for example, a relation is indicated in which "plan 1" at node 1 satisfies conditions at node 2 such as "bound for Italy", two persons, five stays, and below 150,000 yen, and a relation is also indicated in which "bound for Italy" at node 2 is included in another travel plan at node 1 below 150,000 yen such as plan 2. To represent these relations, a relative "HasProperty" is applied.

Therefore, by taking node 2 in [node 1 HasProperty node 2] as a search keyword and taking node 1 connected to node 2 as a search target, keywords for AND search of a plurality of keywords are increased to allow information satisfying a plurality of conditions to be narrowed down. In this manner, travel plans can be narrowed down from the plurality of conditions.

Also, an oval region R12 indicated by a dotted line represents a relation in which a highest-order concept of "bound for Italy" and "bound for Germany" as conditions is "bound for Europe". The region R12 is one example of knowledge for use in answering a user question when the user is assumed not to have knowledge about "bound for Europe". The region R12 is not directly referred to for travel plan search, and is thus provided as a separate frame.

[Sentence Generation Data 133]

FIG. 13 is a diagram of one example of the sentence generation data 133 according to the second example of the present embodiment. FIG. 13 exemplarily depicts templates of an open question, closed question, knowledge acquisition question, and answer for reference by the information processing apparatus 100 and their application conditions.

That is, when outputting an open question regarding a search target, at the time of starting interaction with the user, the information processing apparatus 100 composes a first open question depicted in FIG. 13 "What kind of travel plan are you looking for?", and then (repeatedly) composes a second and onward open question depicted in FIG. 13 "Any other condition?".

Also, when outputting a closed question regarding a search target, the information processing apparatus 100 uses a template depicted in FIG. 13 to output a closed question "Would you choose a plan "X"?".

Also, when outputting a knowledge acquisition question, the information processing apparatus 100 always outputs a question sentence "For example, what kind of travel?" to ask the user to exemplarily provide desired information.

Also, when the information processing apparatus 100 outputs an answer to a user question which is a WHERE question regarding "X" and a relation "Y" IsA "X" is found in the contents data 132 as a knowledge base, the information processing apparatus 100 uses a template of the answer depicted in FIG. 13 "For example, list_up("Y")." to output an answer.

Also, when the information processing apparatus 100 outputs an answer to a user question which is a WHERE question regarding "X" and a relation "X" IsA "Z" is found in the contents data 132 as a knowledge base, the information processing apparatus 100 uses another template of the answer "You can find in "Z"." to output an answer. That is, in accordance with the relation in the contents data 132 as a knowledge base, the information processing apparatus 100 composes an answer such as "For example, Y1, Y2" or "You can find in Z".

Although not depicted, to compose input examples assumed as a user input, a template may be provided in the sentence generation data 133. For example, an information provision template "(keyword) would be fine.", a positive answer template "Yes", and a negative answer template "No" may be stored in the sentence generation data 133.

[Process of Information Processing Apparatus 100]

Figure 14:
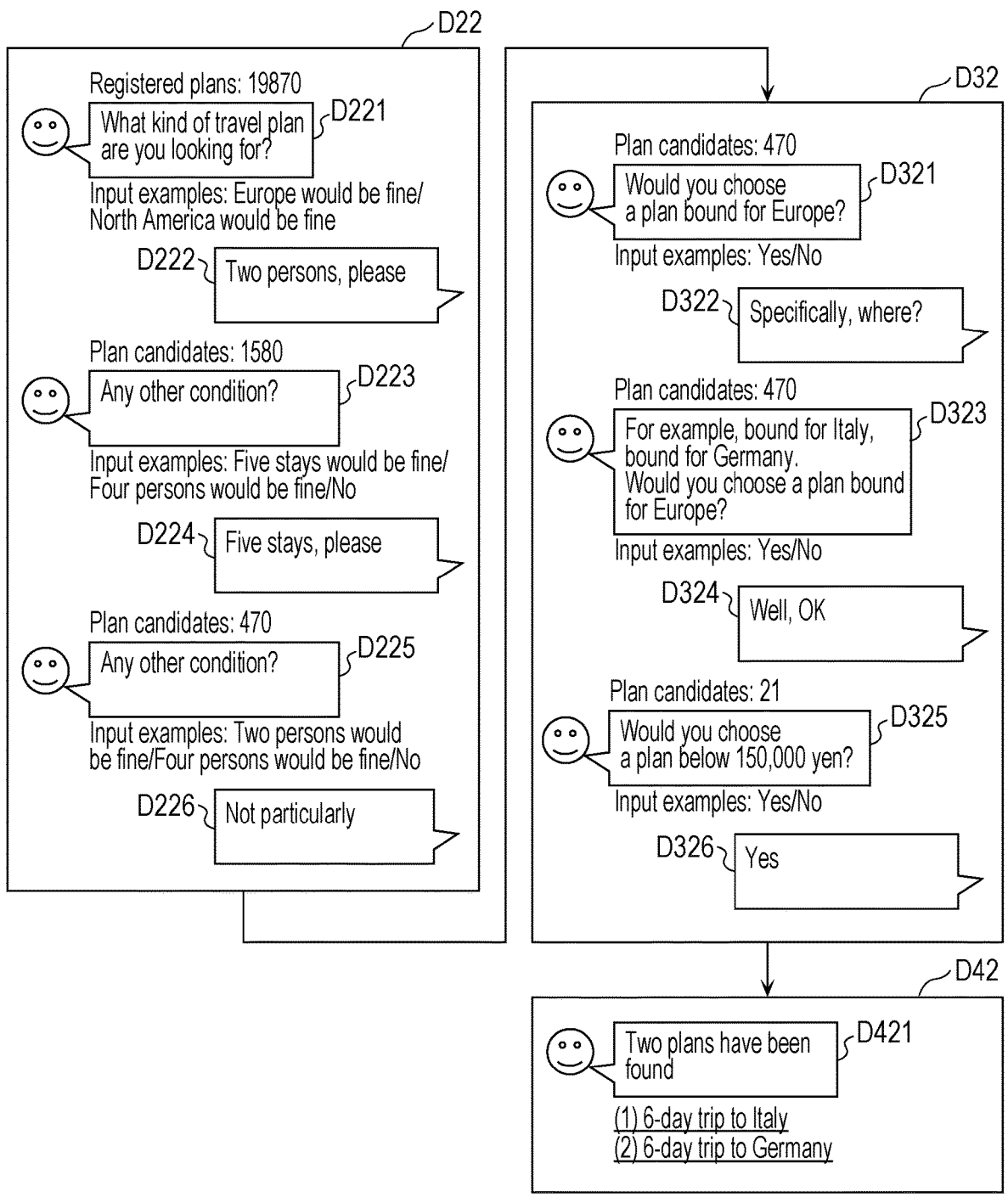
FIG. 14 is a diagram of one example of a display screen according to the second example of the embodiment.

FIG. 14 is a diagram of one example of a display screen according to the second example of the present embodiment.

A display screen D22 represents one example of interaction when the information processing apparatus 100 makes an open question. A display screen D32 represents one example of interaction when the information processing apparatus 100 makes a closed question. A display screen D42 represents one example of a screen displayed when the information processing apparatus 100 presents a conclusion.

In the following, description is made along the process described in FIG. 4 and FIG. 5.

In an initial state, that is, in State 1 of FIG. 5, the number of candidates for a plurality of travel plans as a search target, that is, registered plan information candidates, is assumed to be 19870.

<First Turn and Second Turn>

First, the information processing apparatus 100 performs the question display process at step S3. Specifically, the information processing apparatus 100 first refers to the interaction model 131 of FIG. 5 to determine to make an open question because the state is in an initial state, that is, State 1, and then refers to the sentence generation data 133 of FIG. 13 to generate a system utterance display indicating a first open question "What kind of travel plan are you looking for?". Here, the next input indicated in State 1 of FIG. 5 is assumed to be information provision. Next, the information processing apparatus 100 refers to the contents data 132 of FIG. 12 to extract "Europe" and "North America" as candidates for keywords for narrowing down the plan information candidates and generate an interaction information display for displaying input examples "Europe would be fine" and "North America would be fine".

As a result, on the display screen D22, as a first turn, the question "What kind of travel plan are you looking for?" is displayed in a region D221, first information "Registered plans: 19870" is displayed in a region outside and above the region D221, and second information "Input examples:

Europe would be fine/North America would be fine" is displayed in a region outside and below the region D221, each in a suitable mode. In this manner, while the question "What kind of travel plan are you looking for?" is expressed in spoken language, the first information "Registered plans: 19870" and the second information "Input examples: Europe would be fine/North America would be fine" are briefly expressed by using symbols.

Next, the information processing apparatus 100 performs the answer acquisition process at step S4. Specifically, the information processing apparatus 100 first acquires an input from the user "Two persons, please", and causes the input to be displayed as it is in a region D222 as a second turn on the display screen D22. When comprehending the answer from the user as information provision depicted in FIG. 5, the information processing apparatus 100 further extracts a keyword "two persons".

Next, the information processing apparatus 100 updates the interactive state at step S2. Specifically, the information processing apparatus 100 refers to the interaction model 131 depicted in FIG. 5, in which information provision is inputted when an open question is outputted in State 1, and thus determines that the interactive state makes a transition from State 1 to State 2, and updates the interactive state.

<Third Turn and Fourth Turn>

Subsequently, the information processing apparatus 100 performs the process at step S3 and step S4 again.

First, the information processing apparatus 100 refers to FIG. 5 to determine to make an open question because the state is in State 2, and then refers to FIG. 13 to generate a system utterance display indicating a second open question "Any other condition?". Here, the next input indicated in the open question in State 2 of FIG. 5 is assumed to be information provision or a negative reaction.

Next, the information processing apparatus 100 generates an interaction information display for displaying 1580 candidates acquired by narrowing down the plan information candidates with only the keyword "two persons". Also, the information processing apparatus 100 refers to FIG. 12 to extract "five stays" and "four persons" as keyword candidates for narrowing down the plan information candidates and generate an interaction information display for displaying input examples "Five stays would be fine", "Four persons would be fine", and "No".

As a result, on the display screen D22, as a third turn, the question "Any other condition?" is displayed in a region D223, first information "Plan candidates: 1580" is displayed in a region outside and above the region D223, and second information "Input examples: Five stays would be fine/Four persons would be fine/No" is displayed in a region outside and below the region D223, each in a suitable mode.

Next, the information processing apparatus 100 acquires an input from the user "Five stays, please", and causes the input to be displayed as it is in a region D224 as a fourth turn on the display screen D22. When comprehending the answer from the user as information provision depicted in FIG. 5, the information processing apparatus 100 further extracts a keyword "five stays".

Next, the information processing apparatus 100 updates the interactive state at step S2. Specifically, the information processing apparatus 100 refers to FIG. 5, in which information provision is inputted when an open question is outputted in State 2, and thus determines that the interactive state stays at State 2.

<Fifth Turn and Sixth Turn>

Subsequently, the information processing apparatus 100 performs the process at step S3 and step S4 again.

First, the information processing apparatus 100 refers to FIG. 5 to determine to make an open question because the state is in State 2, and then refers to FIG. 13 to make a third open question and generate a system utterance display indicating "Any other condition?". Here, the next input indicated in the open question in State 2 of FIG. 5 is assumed to be information provision or a negative reaction.

Next, the information processing apparatus 100 generates an interaction information display for displaying 470 candidates acquired by narrowing down the plan information candidates with the keywords "two persons" and "five stays". Also, the information processing apparatus 100 refers to FIG. 12 to extract "two persons" and "four persons" as keyword candidates for narrowing down the plan information candidates and generate an interaction information display for displaying input examples "Two persons would be fine", "Four persons would be fine", and "No".

As a result, on the display screen D22, as a fifth turn, the question "Any other condition?" is displayed in a region D225, first information "Plan candidates: 470" is displayed in a region outside and above the region D225, and second information "Input examples: Two persons would be fine/Four persons would be fine/No" is displayed in a region outside and below the region D225, each in a suitable mode.

Next, the information processing apparatus 100 acquires an input from the user "Not particularly", and causes the input to be displayed as it is in a region D226 as a sixth turn on the display screen D22. The information processing apparatus 100 comprehends the answer from the user as a negative reaction depicted in FIG. 5.

Next, the information processing apparatus 100 updates the interactive state at step S2. Specifically, the information processing apparatus 100 refers to FIG. 5, in which a negative reaction is inputted when an open question is outputted in State 2, and thus determines that the interactive state makes a transition from State 2 to State 3, and updates the interactive state.

<Seventh Turn and Eighth Turn>

Subsequently, the information processing apparatus 100 performs the process at step S3 and step S4 again. While narrowing down the information is performed based on open questions so far, but based on closed questions from now on. When the pieces of plan information are narrowed down to four or less, interaction ends.

First, the information processing apparatus 100 refers to FIG. 5 to determine to make a closed question because the state is in State 3. Here, it is assumed that the information processing apparatus 100 refers to FIG. 12 and extracts a keyword "bound for Europe" for narrowing down the plan information candidates. In this case, as depicted in FIG. 12, a relative between "bound for Europe" and travel plans is "HasProperty". Thus, the information processing apparatus 100 refers to FIG. 13 and uses the template "Would you choose a plan "X"?" to generate a system utterance display indicating a closed question "Would you choose a plan bound for Europe?". Here, the next input indicated in the closed question in State 3 of FIG. 5 is assumed to be a positive reaction or a negative reaction. Also, the keywords are not increased in the previous sixth turn, and thus the number of plan information candidates stays at 470.

Next, the information processing apparatus 100 generates an interaction information display for displaying 470 plan information candidates and an interaction information display for displaying input examples "Yes" and "No".

As a result, on the display screen D32, as a seventh turn, the question "Would you choose a plan bound for Europe?" is displayed in a region D321, first information "Plan candidates: 470" is displayed in a region outside and above the region D321, and second information "Input examples: Yes/No" is displayed in a region outside and below the region D321, each in a suitable mode.

Next, the information processing apparatus 100 acquires an input from the user "Specifically where?", and causes the input to be displayed as it is in a region D322 as an eighth turn on the display screen D32. The information processing apparatus 100 comprehends the answer from the user as a user question (WHERE question) depicted in FIG. 5.

Next, the information processing apparatus 100 updates the interactive state at step S2. Specifically, the information processing apparatus 100 refers to FIG. 5, in which a user question is inputted when a closed question is outputted in State 3, and thus determines that the interactive state makes a transition from State 3 to State 4, and updates the interactive state.

<Ninth Turn and Tenth Turn>

Next, the information processing apparatus 100 performs the question display process at step S3. Specifically, the information processing apparatus 100 refers to FIG. 5 to determine to make an answer because the state is in State 4. Here, the information processing apparatus 100 refers to the region R12 of FIG. 12 and FIG. 13 and uses a template "For example, list_up("Y")." to generate a system utterance display indicating an answer "For example, bound for Italy, bound for Germany". Here, the next input indicated in the answer in State 4 of FIG. 5 is assumed to be "Φ". Thus, the information processing apparatus 100 determines that the interactive state makes a transition to State 3 as it is, and updates the interactive state.

Next, the information processing apparatus 100 refers to FIG. 5 to determine to make a closed question because the state is in State 3. Here, the keyword for narrowing down the plan information candidates is still "bound for Europe". Thus, the information processing apparatus 100 generates a system utterance display indicating a closed question identical to that in the seventh turn "Would you choose a plan bound for Europe?". Here, as described above, the next input indicated in the open question in State 3 of FIG. 5 is assumed to be a positive reaction or a negative reaction, and the keywords are not increased also in the previous turn. Thus, the number of plan information candidates stays at 470. Thus, the information processing apparatus 100 generates an interaction information display for displaying 470 plan information candidates and an interaction information display for displaying input examples "Yes" and "No".

As a result, on the display screen D32, as a ninth turn, an answer and a question "For example, bound for Italy, bound for Germany. Would you choose a plan bound for Europe?" is displayed in a region D323, first information "Plan candidates: 470" is displayed in a region outside and above the region D323, and second information "Input examples: Yes/No" is displayed in a region outside and below the region D323, each in a suitable mode.

Next, the information processing apparatus 100 acquires an input from the user "Well, OK", and causes the input to be displayed as it is in a region D324 as a tenth turn on the display screen D32. The information processing apparatus 100 comprehends the answer from the user as a positive reaction depicted in FIG. 5.

Next, the information processing apparatus 100 updates the interactive state at step S2. Specifically, the information processing apparatus 100 refers to FIG. 5, in which a positive reaction is inputted when a closed question is outputted in State 3, and thus determines that the interactive state stays at State 3.

<Eleventh Turn and Twelfth Turn>

Subsequently, the information processing apparatus 100 performs the process at step S3 and step S4 again.

First, the information processing apparatus 100 refers to FIG. 5 to determine to make a closed question because the state is in State 3. Here, it is assumed that the information processing apparatus 100 extracts a keyword "below 150,000 yen" for narrowing down the plan information candidates. In this case, the information processing apparatus 100 refers to FIG. 13 and uses the template "Would you choose a plan "X"?" to generate a system utterance display indicating a closed question "Would you choose a plan below 150,000 yen?". Here, the next input indicated in the closed question in State 3 of FIG. 5 is assumed to be a positive reaction or a negative reaction. Also, it is assumed that, with the keywords "two persons", "five stays", and "bound for Europe", the plan information candidates are assumed to be narrowed down to 21.

Next, the information processing apparatus 100 generates an interaction information display for displaying 21 plan information candidates and an interaction information display for displaying input examples "Yes" and "No".

As a result, on the display screen D32, as an eleventh turn, the question "Would you choose a plan below 150,000 yen?" is displayed in a region D325, first information "Plan candidates: 21" is displayed in a region outside and above the region D325, and second information "Input examples: Yes/No" is displayed in a region outside and below the region D325, each in a suitable mode.

Next, the information processing apparatus 100 acquires an input from the user "Yes", and causes the input to be displayed as it is in a region D326 as a twelfth turn on the display screen D32. The information processing apparatus 100 comprehends the answer from the user as a positive reaction depicted in FIG. 5.

Next, the information processing apparatus 100 updates the interactive state at step S2. Specifically, the information processing apparatus 100 refers to FIG. 5, in which a positive reaction is inputted when a closed question is outputted in State 3, and thus determines that the interactive state stays at State 3.

<Thirteenth Turn>

Subsequently, the information processing apparatus 100 performs the process at step S3.

Here, with the keywords "two persons", "five stays", "bound for Europe", and "below 150,000 yen", the plan information candidates are narrowed down to two.

In this case, the information processing apparatus 100 refers to FIG. 5 to determine that the state is in State 3 and the number of plan information candidates is four or less, and thus determines to present a conclusion. Although a template for conclusion presentation has not been described, such a template may be stored in the sentence generation data of FIG. 13.

The information processing apparatus 100 refers to FIG. 13 and captures the number of candidates for plan information to generate a system utterance display indicating, for example, "Two plans have been found".

As a result, on a display screen D42, as a thirteen turn, a conclusion presentation "Two plans have been found" is displayed in a region D421, and a list of two plan information candidates acquired by narrowing-down, that is, found travel plans, is displayed in a region outside and below the region D421.

Next, the information processing apparatus 100 updates the interactive state at step S2. Specifically, the information processing apparatus 100 refers to FIG. 5 to determine that the interactive state makes a transition from State 3 to State 5 when a conclusion presentation is outputted in State 3 and any input is acquired from the user, and updates the interactive state.

Third Example

In a third example, an example is described in which a task for narrowing down real estate properties satisfying a plurality of conditions is performed as a task for narrowing down information the user desires to make a search. That is, a case is described in which a search target is a plurality of real estate properties and a question inquires about a request for the plurality of real estate properties.

[Contents Data 132]

Figure 15:
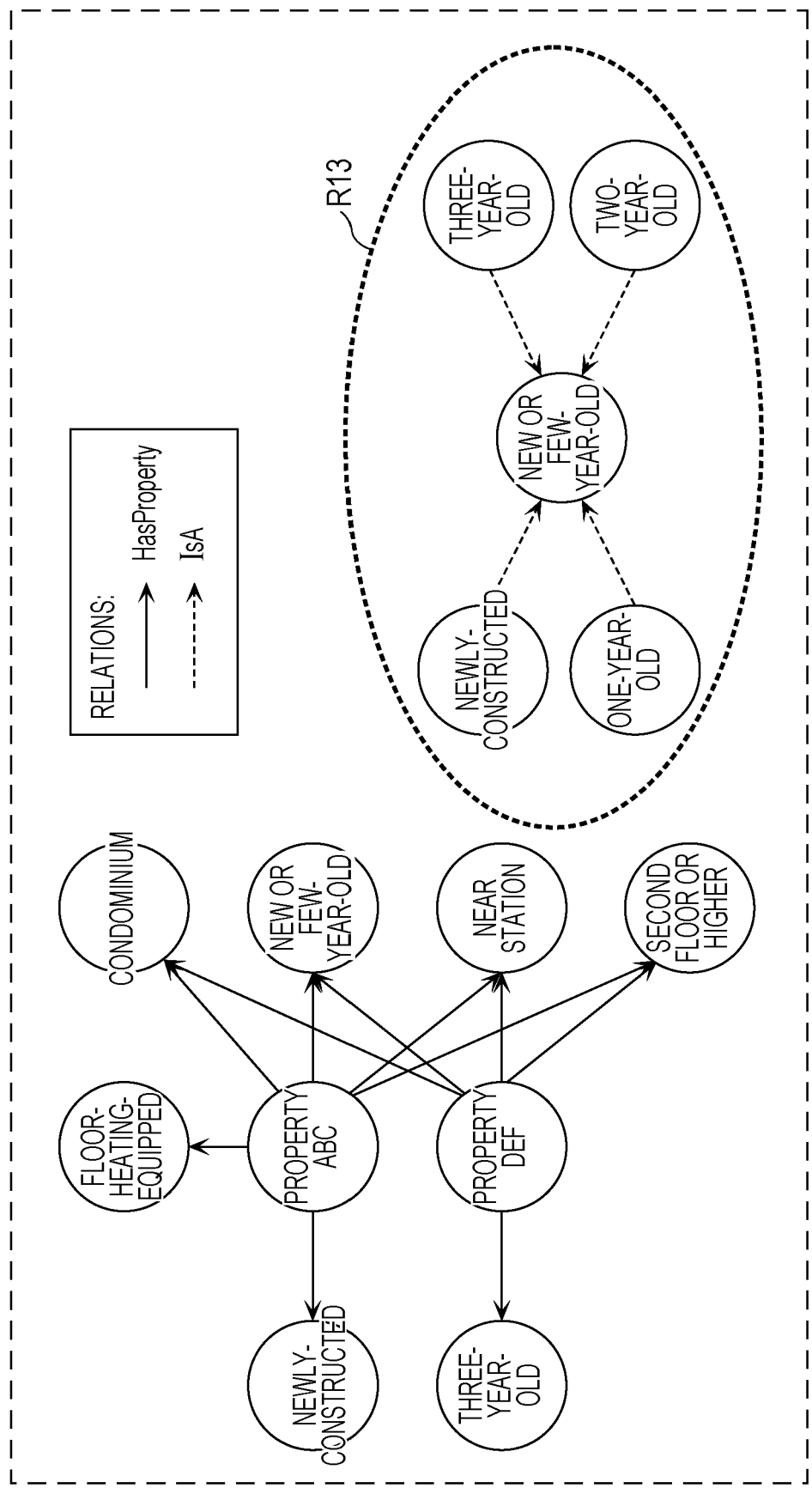
FIG. 15 is a diagram of one example of contents data according to a third example of the embodiment.

FIG. 15 is a diagram of one example of contents data 132 according to the third example of the present embodiment.

FIG. 15 depicts a knowledge base as one example of the contents data 132 in which a relation between real estate properties and conditions is represented in a format of a directed graph. The diagram depicted in FIG. 15 corresponds to an example illustrating part of a huge knowledge base.

In the example depicted in FIG. 15, property ABC and property DEF correspond to a plurality of candidates for a search target; and conditions such as condominium, new or few-year-old, and near station correspond to element information (keywords). Also in FIG. 15, for example, a relation is indicated in which "property ABC" at node 1 satisfies conditions at node 2 such as condominium, new or few-year-old, near station, second floor or higher, and floor-heating-equipped, and a relation is also indicated in which "condominium" at node 2 has another real estate property at node 1 near a station such as property DEF. To represent these relations, a relative "HasProperty" is applied.

Therefore, by taking node 2 in [node 1 HasProperty node 2] as a search keyword and taking node 1 connected to node 2 as a search target, keywords for AND search of a plurality of keywords are increased to allow information satisfying a plurality of conditions to be narrowed down. In this manner, real estate properties can be narrowed down from the plurality of conditions.

Also, an oval region R13 indicated by a dotted line represents a relation in which "new or few-year-old" as a condition is a highest-order concept of newly-constructed, one-year-old, two-year-old, three-year-old as conditions. The region R13 is one example of knowledge for use in answering a user question when the user is assumed not to have knowledge about "new or few-year-old". The region R13 is not directly referred to for real estate property search, and is thus provided as a separate frame.

[Sentence Generation Data 133]

FIG. 16 is a diagram of one example of the sentence generation data 133 according to the third example of the present embodiment. FIG. 16 exemplarily depicts templates of an open question, closed question, knowledge acquisition question, and answer for reference by the information processing apparatus 100 and their application conditions.

That is, when outputting an open question regarding a search target, at the time of starting interaction with the user, the information processing apparatus 100 composes a first open question depicted in FIG. 16 "What kind of property are you looking for?", and then (repeatedly) composes a second and onward open question depicted in FIG. 16 "Any other condition?".

Also, when outputting a closed question regarding a search target, the information processing apparatus 100 uses a template depicted in FIG. 16 to output a closed question "Would you rather choose a "X" property?".

Also, when outputting a knowledge acquisition question, the information processing apparatus 100 always outputs a question sentence "For example, what kind of property?" to ask the user to exemplarily provide desired information.

Also, when the information processing apparatus 100 outputs an answer to a user question which is a WHAT question regarding "X" and a relation "Y" IsA "X" is found in the contents data 132 as a knowledge base, the information processing apparatus 100 uses a template of the answer depicted in FIG. 16 "For example, list_up("Y")." to output an answer.

Also, when the information processing apparatus 100 outputs an answer to a user question which is a WHAT question regarding "X" and a relation "X" IsA "Z" is found in the contents data 132 as a knowledge base, the information processing apparatus 100 uses another template of the answer "An example of "Z"." to output an answer. That is, in accordance with the relation in the contents data 132 as a knowledge base, the information processing apparatus 100 composes an answer such as "For example, Y1, Y2" or "An example of Z".

Although not depicted, to compose input examples assumed as a user input, a template may be provided in the sentence generation data 133. For example, an information provision template "(keyword) would be fine.", a positive answer template "Yes", and a negative answer template "No" may be stored in the sentence generation data 133.

[Process of Information Processing Apparatus 100]

Figure 17:
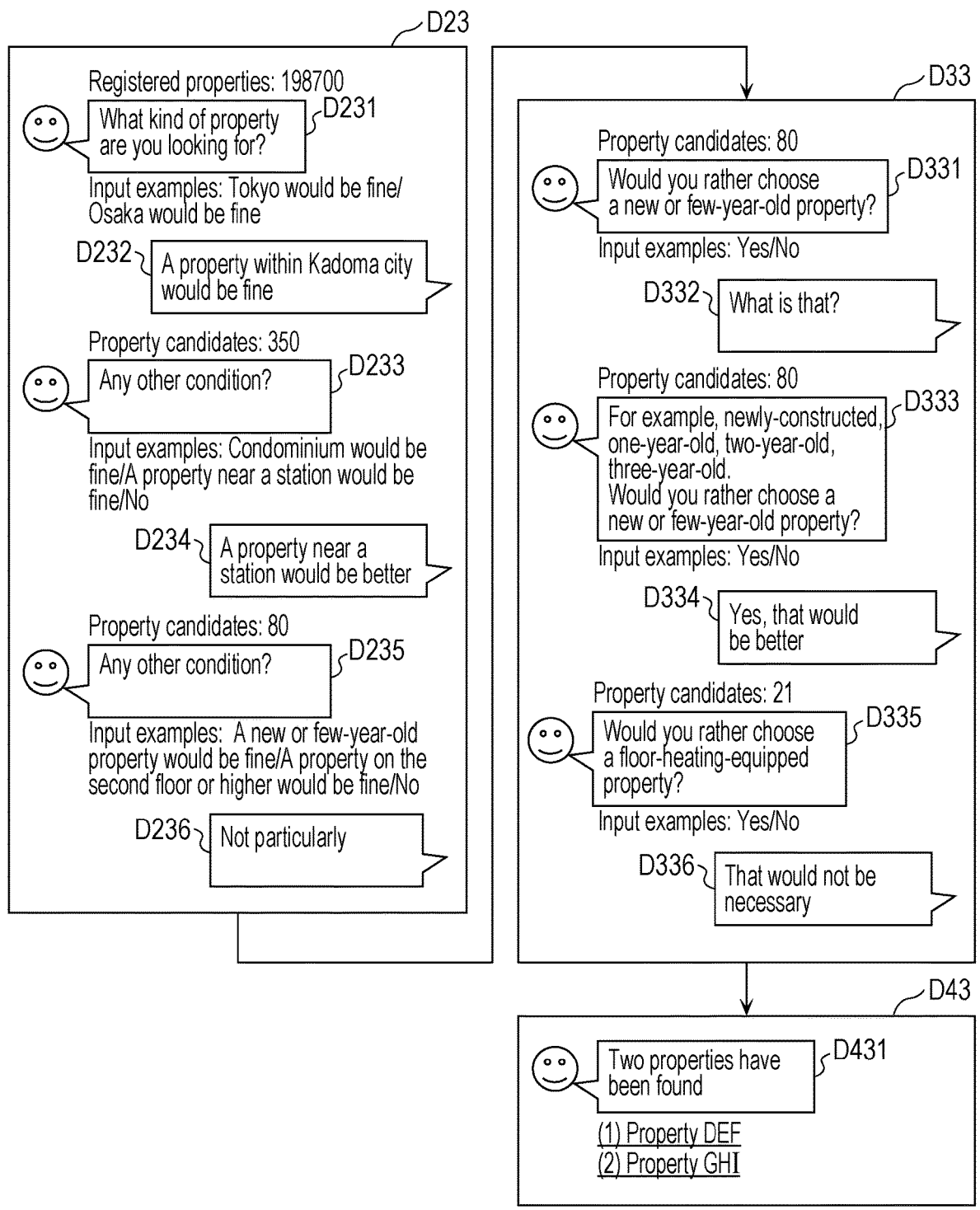
FIG. 17 is a diagram of one example of a display screen according to the third example of the embodiment.

FIG. 17 is a diagram of one example of a display screen according to the third example of the present embodiment.

A display screen D23 represents one example of interaction when the information processing apparatus 100 makes an open question. A display screen D33 represents one example of interaction when the information processing apparatus 100 makes a closed question. A display screen D43 represents one example of a screen displayed when the information processing apparatus 100 presents a conclusion.

In the following, description is made along the process described in FIG. 4 and FIG. 5.

In an initial state, that is, in State 1 of FIG. 5, the number of candidates for a plurality of real estate properties as a search target, that is, registered property candidates, is assumed to be 198700.

<First Turn and Second Turn>

First, the information processing apparatus 100 performs the question display process at step S3. Specifically, the information processing apparatus 100 first refers to the interaction model 131 of FIG. 5 to determine to make an open question because the state is in an initial state, that is, State 1, and then refers to the sentence generation data 133 of FIG. 16 to generate a system utterance display indicating a first open question "What kind of property are you looking for?". Here, the next input indicated in State 1 of FIG. 5 is assumed to be information provision. Next, the information processing apparatus 100 refers to the contents data 132 of FIG. 15 to extract "Tokyo" and "Osaka" as candidates for keywords for narrowing down the property candidates and generate an interaction information display for displaying input examples "Tokyo would be fine" and "Osaka would be fine".

As a result, on the display screen D23, as a first turn, the question "What kind of property are you looking for?" is displayed in a region D231, first information "Registered properties: 198700" is displayed in a region outside and above the region D231, and second information "Input examples: Tokyo would be fine/Osaka would be fine" is displayed in a region outside and below the region D231, each in a suitable mode. In this manner, while the question "What kind of property are you looking for?" is expressed in spoken language, the first information "Registered properties: 198700" and the second information "Input examples: Tokyo would be fine/Osaka would be fine" are briefly expressed by using symbols.

Next, the information processing apparatus 100 performs the answer acquisition process at step S4. Specifically, the information processing apparatus 100 first acquires an input from the user "A property within Kadoma city would be fine", and causes the input to be displayed as it is in a region D232 as a second turn on the display screen D23. When comprehending the answer from the user as information provision depicted in FIG. 5, the information processing apparatus 100 further extracts a keyword "within Kadoma city" (not depicted).

Next, the information processing apparatus 100 updates the interactive state at step S2. Specifically, the information processing apparatus 100 refers to the interaction model 131 depicted in FIG. 5, in which information provision is inputted when an open question is outputted in State 1, and thus determines that the interactive state makes a transition from State 1 to State 2, and updates the interactive state.

<Third Turn and Fourth Turn>

Subsequently, the information processing apparatus 100 performs the process at step S3 and step S4 again.

First, the information processing apparatus 100 refers to FIG. 5 to determine to make an open question because the state is in State 2, and then refers to FIG. 16 to generate a system utterance display indicating a second open question "Any other condition?". Here, the next input indicated in the open question in State 2 of FIG. 5 is assumed to be information provision or a negative reaction.

Next, the information processing apparatus 100 generates an interaction information display for displaying 350 candidates acquired by narrowing down the property candidates with only the keyword "within Kadoma city". Also, the information processing apparatus 100 refers to FIG. 15 to extract "condominium" and "near station" as keyword candidates for narrowing down the property candidates and generate an interaction information display for displaying input examples "Condominium would be fine", "A property near a station would be fine", and "No".

As a result, on the display screen D23, as a third turn, the question "Any other condition?" is displayed in a region D233, first information "Property candidates: 350" is displayed in a region outside and above the region D233, and second information "Input examples: Condominium would be fine/A property near a station would be fine/No" is displayed in a region outside and below the region D233, each in a suitable mode.

Next, the information processing apparatus 100 acquires an input from the user "A property near a station would be better", and causes the input to be displayed as it is in a region D234 as a fourth turn on the display screen D23. When comprehending the answer from the user as information provision depicted in FIG. 5, the information processing apparatus 100 further extracts a keyword "near station".

Next, the information processing apparatus 100 updates the interactive state at step S2. Specifically, the information processing apparatus 100 refers to FIG. 5, in which information provision is inputted when an open question is outputted in State 2, and thus determines that the interactive state stays at State 2.

<Fifth Turn and Sixth Turn>

Subsequently, the information processing apparatus 100 performs the process at step S3 and step S4 again.

First, the information processing apparatus 100 refers to FIG. 5 to determine to make an open question because the state is in State 2, and then refers to FIG. 16 to make a third open question and generate a system utterance display indicating "Any other condition?". Here, the next input indicated in the open question in State 2 of FIG. 5 is assumed to be information provision or a negative reaction.

Next, the information processing apparatus 100 generates an interaction information display for displaying 80 candidates acquired by narrowing down the property candidates with the keywords "within Kadoma city" and "near station". Also, the information processing apparatus 100 refers to FIG. 15 to extract "new or few-year-old" and "second floor or higher" as keyword candidates for narrowing down the property candidates and generate an interaction information display for displaying input examples "A new or few-year-old property would be fine", "A property on the second floor or higher would be fine", and "No".

As a result, on the display screen D23, as a fifth turn, the question "Any other condition?" is displayed in a region D235, first information "Property candidates: 80" is displayed in a region outside and above the region D235, and second information "Input examples: A new or few-year-old property would be fine/A property on the second floor or higher would be fine/No" is displayed in a region outside and below the region D235, each in a suitable mode.

Next, the information processing apparatus 100 acquires an input from the user "Not particularly", and causes the input to be displayed as it is in a region D236 as a sixth turn on the display screen D23. The information processing apparatus 100 comprehends the answer from the user as a negative reaction depicted in FIG. 5.

Next, the information processing apparatus 100 updates the interactive state at step S2. Specifically, the information processing apparatus 100 refers to FIG. 5, in which a negative reaction is inputted when an open question is outputted in State 2, and thus determines that the interactive state makes a transition from State 2 to State 3, and updates the interactive state.

<Seventh Turn and Eighth Turn>

Subsequently, the information processing apparatus 100 performs the process at step S3 and step S4 again. While narrowing down the information is performed based on open questions so far, but based on closed questions from now on. When the properties are narrowed down to four or less, interaction ends.

First, the information processing apparatus 100 refers to FIG. 5 to determine to make a closed question because the state is in State 3. Here, it is assumed that the information processing apparatus 100 refers to FIG. 15 and extracts a keyword "new or few-year-old" for narrowing down the property candidates. In this case, as depicted in FIG. 15, a relative between "new or few-year-old" and properties is "HasProperty". Thus, the information processing apparatus 100 refers to FIG. 16 and uses the template "Would you rather choose a "X" property?" to generate a system utterance display indicating a closed question "Would you rather choose a new or few-year-old property?". Here, the next input indicated in the closed question in State 3 of FIG. 5 is assumed to be a positive reaction or a negative reaction. Also, the keywords are not increased in the previous sixth turn, and thus the number of property candidates stays at 80.

Next, the information processing apparatus 100 generates an interaction information display for displaying 80 property candidates and an interaction information display for displaying input examples "Yes" and "No".

As a result, on the display screen D33, as a seventh turn, the question "Would you rather choose a new or few-year-old property?" is displayed in a region D331, first information "Property candidates: 80" is displayed in a region outside and above the region D331, and second information "Input examples: Yes/No" is displayed in a region outside and below the region D331, each in a suitable mode.

Next, the information processing apparatus 100 acquires an input from the user "What is that?", and causes the input to be displayed as it is in a region D332 as an eighth turn on the display screen D33. The information processing apparatus 100 comprehends the answer from the user as a user question (WHAT question) depicted in FIG. 5.

Next, the information processing apparatus 100 updates the interactive state at step S2. Specifically, the information processing apparatus 100 refers to FIG. 5, in which a user question is inputted when a closed question is outputted in State 3, and thus determines that the interactive state makes a transition from State 3 to State 4, and updates the interactive state.

<Ninth Turn and Tenth Turn>

Next, the information processing apparatus 100 performs the question display process at step S3. Specifically, the information processing apparatus 100 refers to FIG. 5 to determine to make an answer because the state is in State 4. Here, the information processing apparatus 100 refers to the region R13 of FIG. 15 and FIG. 16 and uses a template "For example, list_up("Y")." to generate a system utterance display indicating an answer "For example, newly-constructed, one-year-old, two-year-old, three-year-old". Here, the next input indicated in the answer in State 4 of FIG. 5 is assumed to be "Φ". Thus, the information processing apparatus 100 determines that the interactive state makes a transition to State 3 as it is, and updates the interactive state.

Next, the information processing apparatus 100 refers to FIG. 5 to determine to make a closed question because the state is in State 3. Here, the keyword for narrowing down the property candidates is still "new or few-year-old". Thus, the information processing apparatus 100 generates a system utterance display indicating a closed question identical to that in the seventh turn "Would you rather choose a new or few-year-old property?". Here, as described above, the next input indicated in the open question in State 3 of FIG. 5 is assumed to be a positive reaction or a negative reaction, and the keywords are not increased also in the previous turn. Thus, the number of property candidates stays at 80. Thus, the information processing apparatus 100 generates an interaction information display for displaying 80 property candidates and an interaction information display for displaying input examples "Yes" and "No".

As a result, on the display screen D33, as a ninth turn, an answer and a question "For example, newly-constructed, one-year-old, two-year-old, three-year-old. Would you rather choose a new or few-year-old property?" is displayed in a region D333, first information "Property candidates: 80" is displayed in a region outside and above the region D333, and second information "Input examples: Yes/No" is displayed in a region outside and below the region D333, each in a suitable mode.

Next, the information processing apparatus 100 acquires an input from the user "Yes, that would be better", and causes the input to be displayed as it is in a region D334 as a tenth turn on the display screen D33. The information processing apparatus 100 comprehends the answer from the user as a positive reaction depicted in FIG. 5.

Next, the information processing apparatus 100 updates the interactive state at step S2. Specifically, the information processing apparatus 100 refers to FIG. 5, in which a positive reaction is inputted when a closed question is outputted in State 3, and thus determines that the interactive state stays at State 3.

<Eleventh Turn and Twelfth Turn>

Subsequently, the information processing apparatus 100 performs the process at step S3 and step S4 again.

First, the information processing apparatus 100 refers to FIG. 5 to determine to make a closed question because the state is in State 3. Here, it is assumed that the information processing apparatus 100 extracts a keyword "floor-heating-equipped" for narrowing down the property candidates. In this case, the information processing apparatus 100 refers to FIG. 16 and uses the template "Would you rather choose a "X" property?" to generate a system utterance display indicating a closed question "Would you rather choose a floor-heating-equipped property?". Here, the next input indicated in the closed question in State 3 of FIG. 5 is assumed to be a positive reaction or a negative reaction. Also, it is assumed that, with the keywords "within Kadoma city", "near station", and "new or few-year-old", the property candidates are assumed to be narrowed down to 21.

Next, the information processing apparatus 100 generates an interaction information display for displaying 21 property candidates and an interaction information display for displaying input examples "Yes" and "No".

As a result, on the display screen D33, as an eleventh turn, the question "Would you rather choose a floor-heating-equipped property?" is displayed in a region D335, first information "Property candidates: 21" is displayed in a region outside and above the region D335, and second information "Input examples: Yes/No" is displayed in a region outside and below the region D335, each in a suitable mode.

Next, the information processing apparatus 100 acquires an input from the user "That would not be necessary", and causes the input to be displayed as it is in a region D336 as a twelfth turn on the display screen D33. The information processing apparatus 100 comprehends the answer from the user as a negative reaction depicted in FIG. 5.

Next, the information processing apparatus 100 updates the interactive state at step S2. Specifically, the information processing apparatus 100 refers to FIG. 5, in which a negative reaction is inputted when a closed question is outputted in State 3, and thus determines that the interactive state stays at State 3.

<Thirteenth Turn>

Subsequently, the information processing apparatus 100 performs the process at step S3.

Here, with the keywords "within Kadoma city", "near station", "new of few-year-old", and "floor-heating-unequipped", the property candidates are narrowed down to two.

In this case, the information processing apparatus 100 refers to FIG. 5 to determine that the state is in State 3 and the number of property candidates is four or less, and thus determines to present a conclusion. Although a template for conclusion presentation has not been described, such a template may be stored in the sentence generation data of FIG. 16.

The information processing apparatus 100 refers to FIG. 16 and captures the number of property candidates to generate a system utterance display indicating, for example, "Two properties have been found".

As a result, on a display screen D43, as a thirteen turn, a conclusion presentation "Two properties have been found" is displayed in a region D431, and a list of two property candidates acquired by narrowing-down, that is, found real estate properties, is displayed in a region outside and below the region D431.

Next, the information processing apparatus 100 updates the interactive state at step S2. Specifically, the information processing apparatus 100 refers to FIG. 5 to determine that the interactive state makes a transition from State 3 to State 5 when a conclusion presentation is outputted in State 3 and any input is acquired from the user, and updates the interactive state.

Fourth Example

In a fourth example, an example is described in which a task for narrowing down video contents satisfying a plurality of conditions is performed as a task for narrowing down information the user desires to make a search. That is, a case is described in which a search target is a plurality of video contents and a question inquires about a request for the plurality of video contents.

[Contents Data 132]

Figure 18:
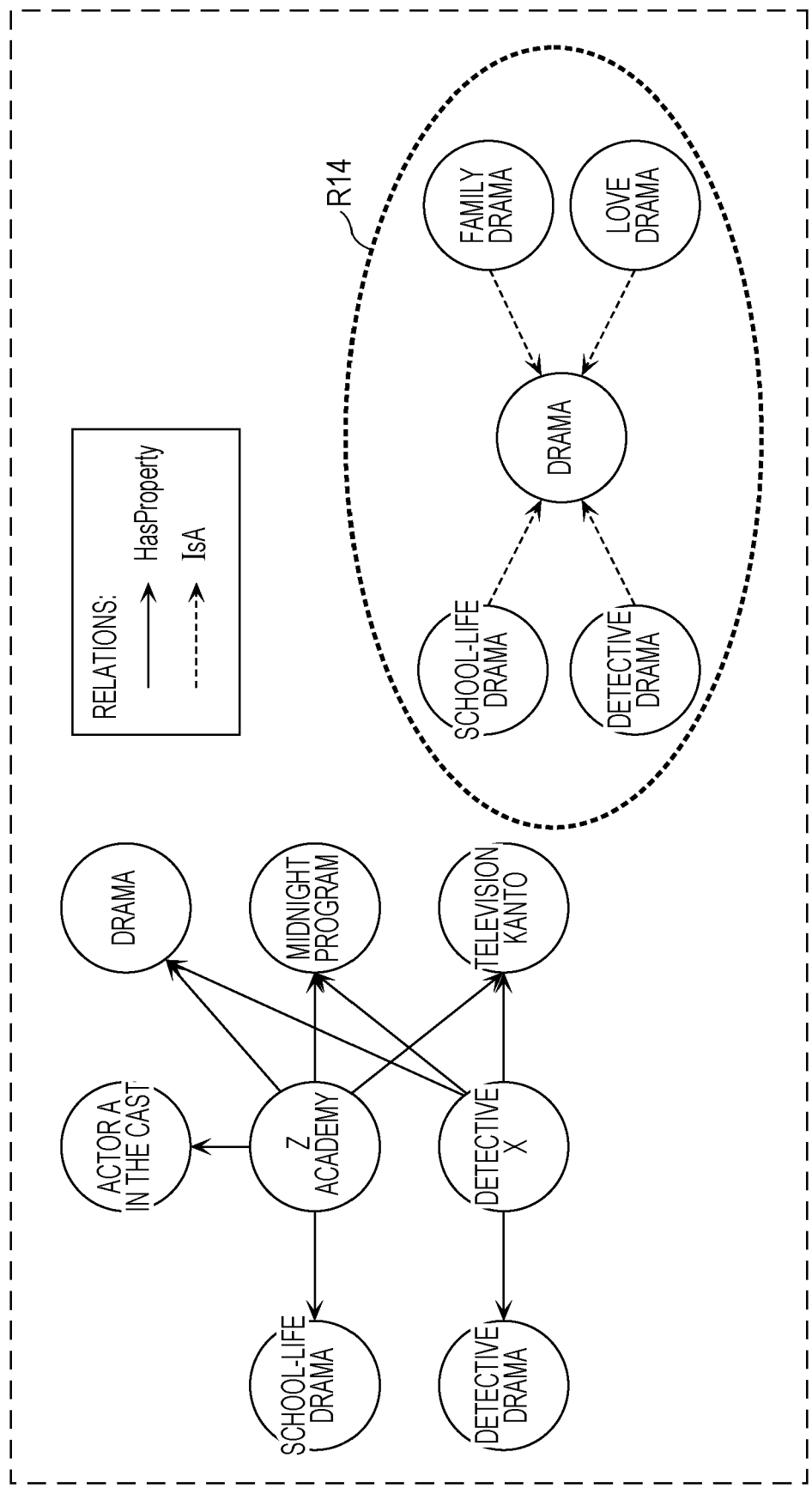
FIG. 18 is a diagram of one example of contents data according to a fourth example of the embodiment.

FIG. 18 is a diagram of one example of the contents data 132 according to the fourth example of the present embodiment;

FIG. 18 depicts a knowledge base as one example of the contents data 132 in which a relation between video contents and conditions is represented in a format of a directed graph. The diagram depicted in FIG. 18 corresponds to an example illustrating part of a huge knowledge base.

In the example depicted in FIG. 18, Z academy and Detective X correspond to a plurality of candidates for a search target; and conditions such as drama, midnight program, Television Kanto, and so forth correspond to element information (keywords). Also in FIG. 18, for example, a relation is indicated in which "Z academy" at node 1 satisfies conditions at node 2 such as actor A in the cast, drama, midnight program, Television Kanto, and school-life drama and a relation is also indicated in which "drama" at node 2 has another video content at node 1 such as midnight program like Detective X. To represent these relations, a relative "HasProperty" is applied.

Therefore, by taking node 2 in [node 1 HasProperty node 2] as a search keyword and taking node 1 connected to node 2 as a search target, keywords for AND search of a plurality of keywords are increased to allow information satisfying a plurality of conditions to be narrowed down. In this manner, candidates for video contents can be narrowed down from the plurality of conditions.

Also, an oval region R14 indicated by a dotted line represents a relation in which "drama" as a condition is a highest-order concept of school-life drama, detective drama, family drama, and love drama as conditions. The region R14 is one example of knowledge for use in answering a user question when the user is assumed not to have knowledge about "drama". The region R14 is not directly referred to for video contents candidate search, and is thus provided as a separate frame.

[Sentence Generation Data 133]

FIG. 19 is a diagram of one example of the sentence generation data 133 according to the fourth example of the present embodiment. FIG. 19 exemplarily depicts templates of an open question, closed question, knowledge acquisition question, and answer for reference by the information processing apparatus 100 and their application conditions.

That is, when outputting an open question regarding a search target, at the time of starting interaction with the user, the information processing apparatus 100 composes a first open question depicted in FIG. 19 "What kind of program are you looking for?", and then repeatedly composes a second and onward open question depicted in FIG. 19 "Any other condition?".

Also, when outputting a closed question regarding a search target, the information processing apparatus 100 uses a template depicted in FIG. 19 to output a closed question "Would "X" be fine?".

Also, when outputting a knowledge acquisition question, the information processing apparatus 100 always outputs a question sentence "For example, what kind of program?" to ask the user to exemplarily provide desired information.

Also, when the information processing apparatus 100 outputs an answer to a user question which is a WHAT question regarding "X" and a relation "Y" IsA "X" is found in the contents data 132 as a knowledge base, the information processing apparatus 100 uses a template of the answer depicted in FIG. 19 "For example, list_up("Y")." to output an answer.

Also, when the information processing apparatus 100 outputs an answer to a user question which is a WHAT question regarding "X" and a relation "X" IsA "Z" is found in the contents data 132 as a knowledge base, the information processing apparatus 100 uses another template of the answer "An example of "Z"." to output an answer. That is, in accordance with the relation in the contents data 132 as a knowledge base, the information processing apparatus 100 composes an answer such as "For example, Y1, Y2" or "An example of Z".

Although not depicted, to compose input examples assumed as a user input, a template may be provided in the sentence generation data 133. For example, an information provision template "(keyword) would be fine.", a positive answer template "Yes", and a negative answer template "No" may be stored in the sentence generation data 133.

[Process of Information Processing Apparatus 100]

Figure 20:
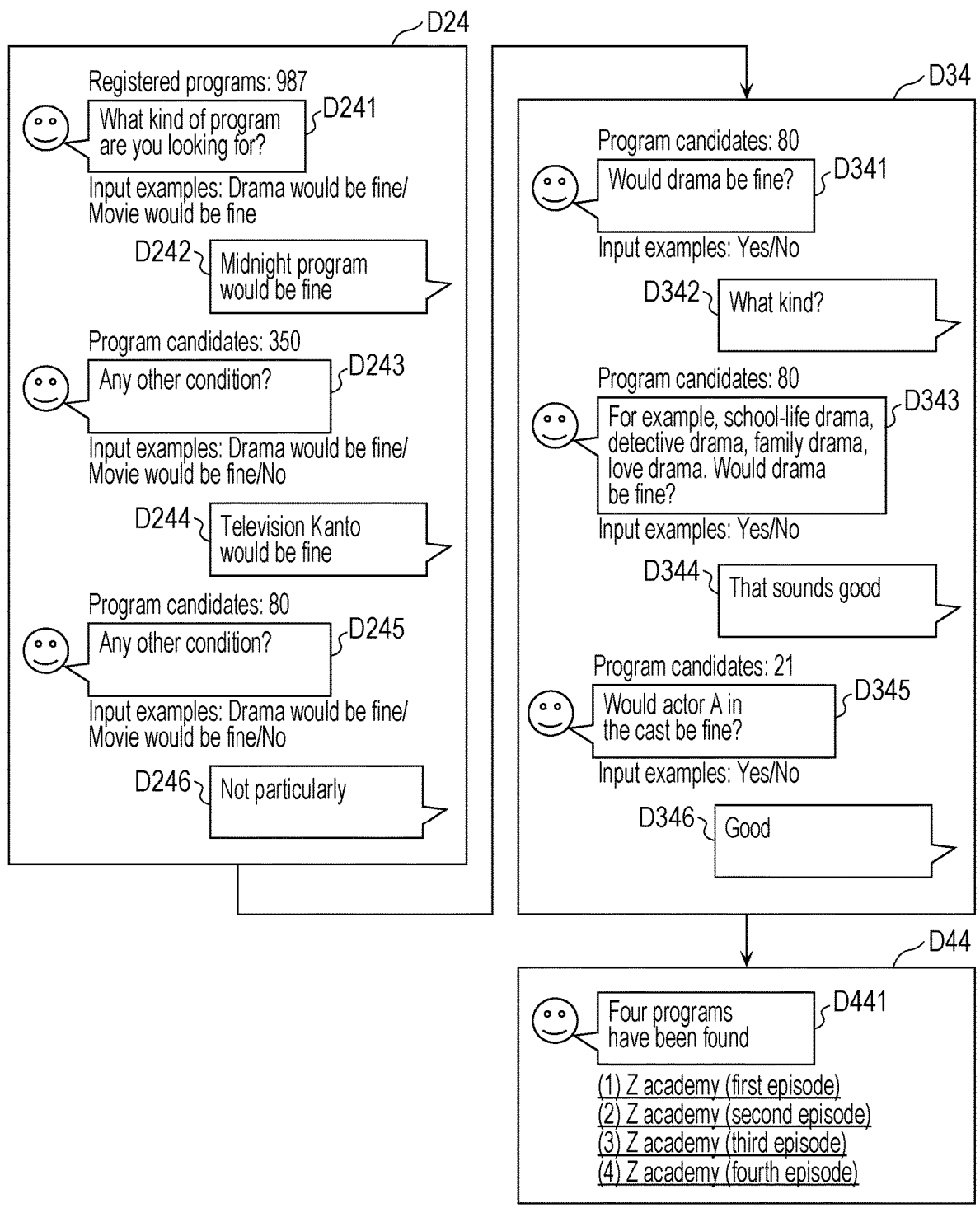
FIG. 20 is a diagram of one example of a display screen according to the fourth example of the embodiment.

FIG. 20 is a diagram of one example of a display screen according to the fourth example of the present embodiment.

A display screen D24 represents one example of interaction when the information processing apparatus 100 makes an open question. A display screen D34 represents one example of interaction when the information processing apparatus 100 makes a closed question. A display screen D44 represents one example of a screen displayed when the information processing apparatus 100 presents a conclusion.

In the following, description is made along the process described in FIG. 4 and FIG. 5.

In an initial state, that is, in State 1 of FIG. 5, the number of candidates for a plurality of video contents as a search target, that is, registered program information candidates, is assumed to be 987.

<First Turn and Second Turn>

First, the information processing apparatus 100 performs the question display process at step S3. Specifically, the information processing apparatus 100 first refers to the interaction model 131 of FIG. 5 to determine to make an open question because the state is in an initial state, that is, State 1, and then refers to the sentence generation data 133 of FIG. 19 to generate a system utterance display indicating a first open question "What kind of program are you looking for?". Here, the next input indicated in State 1 of FIG. 5 is assumed to be information provision. Next, the information processing apparatus 100 refers to the contents data 132 of FIG. 18 to extract "drama" and "movie" (not depicted) as candidates for keywords for narrowing down the program information candidates and generate an interaction information display for displaying input examples "Drama would be fine" and "Movie would be fine".

As a result, on the display screen D24, as a first turn, the question "What kind of program are you looking for?" is displayed in a region D241, first information "Registered programs: 987" is displayed in a region outside and above the region D241, and second information "Input examples: Drama would be fine/Movie would be fine" is displayed in a region outside and below the region D241, each in a suitable mode. In this manner, while the question "What kind of program are you looking for?" is expressed in spoken language, the first information "Registered programs: 987" and the second information "Input examples: Drama would be fine/Movie would be fine" are briefly expressed by using symbols.

Next, the information processing apparatus 100 performs the answer acquisition process at step S4. Specifically, the information processing apparatus 100 first acquires an input from the user "Midnight program would be fine", and causes the input to be displayed as it is in a region D242 as a second turn on the display screen D24. When comprehending the answer from the user as information provision depicted in FIG. 5, the information processing apparatus 100 further extracts a keyword "midnight program".

Next, the information processing apparatus 100 updates the interactive state at step S2. Specifically, the information processing apparatus 100 refers to the interaction model 131 depicted in FIG. 5, in which information provision is inputted when an open question is outputted in State 1, and thus determines that the interactive state makes a transition from State 1 to State 2, and updates the interactive state.

<Third Turn and Fourth Turn>

Subsequently, the information processing apparatus 100 performs the process at step S3 and step S4 again.

First, the information processing apparatus 100 refers to FIG. 5 to determine to make an open question because the state is in State 2, and then refers to FIG. 19 to generate a system utterance display indicating a second open question "Any other condition?". Here, the next input indicated in the open question in State 2 of FIG. 5 is assumed to be information provision or a negative reaction.

Next, the information processing apparatus 100 generates an interaction information display for displaying 350 candidates acquired by narrowing down the program information candidates with only the keyword "midnight program". Also, the information processing apparatus 100 refers to FIG. 18 to extract "drama" and "movie" as keyword candidates for narrowing down the program information candidates and generate an interaction information display for displaying input examples "Drama would be fine", "Movie would be fine", and "No".

As a result, on the display screen D24, as a third turn, the question "Any other condition?" is displayed in a region D243, first information "Program candidates: 350" is displayed in a region outside and above the region D243, and second information "Input examples: Drama would be fine/ Movie would be fine/No" is displayed in a region outside and below the region D243, each in a suitable mode.

Next, the information processing apparatus 100 acquires an input from the user "Television Kanto would be fine", and causes the input to be displayed as it is in a region D244 as a fourth turn on the display screen D24. When comprehending the answer from the user as information provision depicted in FIG. 5, the information processing apparatus 100 further extracts a keyword "Television Kanto".

Next, the information processing apparatus 100 updates the interactive state at step S2. Specifically, the information processing apparatus 100 refers to FIG. 5, in which information provision is inputted when an open question is outputted in State 2, and thus determines that the interactive state stays at State 2.

<Fifth Turn and Sixth Turn>

Subsequently, the information processing apparatus 100 performs the process at step S3 and step S4 again.

First, the information processing apparatus 100 refers to FIG. 5 to determine to make an open question because the state is in State 2, and then refers to FIG. 19 to make a third open question and generate a system utterance display indicating "Any other condition?". Here, the next input indicated in the open question in State 2 of FIG. 5 is assumed to be information provision or a negative reaction.

Next, the information processing apparatus 100 generates an interaction information display for displaying 80 candidates acquired by narrowing down the program information candidates with the keywords "midnight program" and "Television Kanto". Also, the information processing apparatus 100 refers to FIG. 18 to extract "drama" and "movie" as keyword candidates for narrowing down the program information candidates and generate an interaction information display for displaying input examples "Drama would be fine", "Movie would be fine", and "No".

As a result, on the display screen D24, as a fifth turn, the question "Any other condition?" is displayed in a region D245, first information "Program candidates: 80" is displayed in a region outside and above the region D245, and second information "Input examples: Drama would be fine/ Movie would be fine/No" is displayed in a region outside and below the region D245, each in a suitable mode.

Next, the information processing apparatus 100 acquires an input from the user "Not particularly", and causes the input to be displayed as it is in a region D246 as a sixth turn on the display screen D24. The information processing apparatus 100 comprehends the answer from the user as a negative reaction depicted in FIG. 5.

Next, the information processing apparatus 100 updates the interactive state at step S2. Specifically, the information processing apparatus 100 refers to FIG. 5, in which a negative reaction is inputted when an open question is outputted in State 2, and thus determines that the interactive state makes a transition from State 2 to State 3, and updates the interactive state.

<Seventh Turn and Eighth Turn>

Subsequently, the information processing apparatus 100 performs the process at step S3 and step S4 again. While narrowing down the information is performed based on open questions so far, but based on closed questions from now on. When the pieces of program information are narrowed down to four or less, interaction ends.

First, the information processing apparatus 100 refers to FIG. 5 to determine to make a closed question because the state is in State 3. Here, it is assumed that the information processing apparatus 100 refers to FIG. 18 and extracts a keyword "drama" for narrowing down the program information candidates. In this case, as depicted in FIG. 18, a relative between "drama" and video contents is "HasProperty". Thus, the information processing apparatus 100 refers to FIG. 19 and uses the template "Would "X" be fine?" to generate a system utterance display indicating a closed question "Would drama be fine?". Here, the next input indicated in the closed question in State 3 of FIG. 5 is assumed to be a positive reaction or a negative reaction.

Also, the keywords are not increased in the previous sixth turn, and thus the number of program information candidates stays at 80.

Next, the information processing apparatus 100 generates an interaction information display for displaying 80 program information candidates and an interaction information display for displaying input examples "Yes" and "No".

As a result, on the display screen D34, as a seventh turn, the question "Would drama be fine?" is displayed in a region D341, first information "Program candidates: 80" is displayed in a region outside and above the region D341, and second information "Input examples: Yes/No" is displayed in a region outside and below the region D341, each in a suitable mode.

Next, the information processing apparatus 100 acquires an input from the user "What kind?", and causes the input to be displayed as it is in a region D342 as an eighth turn on the display screen D34. The information processing apparatus 100 comprehends the answer from the user as a user question (WHAT question) depicted in FIG. 5.

Next, the information processing apparatus 100 updates the interactive state at step S2. Specifically, the information processing apparatus 100 refers to FIG. 5, in which a user question is inputted when a closed question is outputted in State 3, and thus determines that the interactive state makes a transition from State 3 to State 4, and updates the interactive state.

<Ninth Turn and Tenth Turn>

Next, the information processing apparatus 100 performs the question display process at step S3. Specifically, the information processing apparatus 100 refers to FIG. 5 to determine to make an answer because the state is in State 4. Here, the information processing apparatus 100 refers to the region R14 of FIG. 18 and FIG. 19 and uses a template "For example, list_up("Y")." to generate a system utterance display indicating an answer "For example, school-life drama, detective drama, family drama, love drama". Here, the next input indicated in the answer in State 4 of FIG. 5 is assumed to be "Φ". Thus, the information processing apparatus 100 determines that the interactive state makes a transition to State 3 as it is, and updates the interactive state.

Next, the information processing apparatus 100 refers to FIG. 5 to determine to make a closed question because the state is in State 3. Here, the keyword for narrowing down the program information candidates is still "drama". Thus, the information processing apparatus 100 generates a system utterance display indicating a closed question identical to that in the seventh turn "Would drama be fine?". Here, as described above, the next input indicated in the open question in State 3 of FIG. 5 is assumed to be a positive reaction or a negative reaction, and the keywords are not increased also in the previous turn. Thus, the number of program information candidates stays at 80. Thus, the information processing apparatus 100 generates an interaction information display for displaying 80 program information candidates and an interaction information display for displaying input examples "Yes" and "No".

As a result, on the display screen D34, as a ninth turn, an answer and a question "For example, school-life drama, detective drama, family drama, love drama. Would drama be fine?" is displayed in a region D343, first information "Program candidates: 80" is displayed in a region outside and above the region D343, and second information "Input examples: Yes/No" is displayed in a region outside and below the region D343, each in a suitable mode.

Next, the information processing apparatus 100 acquires an input from the user "That sounds good", and causes the input to be displayed as it is in a region D344 as a tenth turn on the display screen D34. The information processing apparatus 100 comprehends the answer from the user as a positive reaction depicted in FIG. 5.

Next, the information processing apparatus 100 updates the interactive state at step S2. Specifically, the information processing apparatus 100 refers to FIG. 5, in which a positive reaction is inputted when a closed question is outputted in State 3, and thus determines that the interactive state stays at State 3.

<Eleventh Turn and Twelfth Turn>

Subsequently, the information processing apparatus 100 performs the process at step S3 and step S4 again.

First, the information processing apparatus 100 refers to FIG. 5 to determine to make a closed question because the state is in State 3. Here, it is assumed that the information processing apparatus 100 extracts a keyword "actor A in the cast" for narrowing down the program information candidates. In this case, the information processing apparatus 100 refers to FIG. 19 and uses the template "Would "X" be fine?" to generate a system utterance display indicating a closed question "Would actor A in the cast be fine?". Here, the next input indicated in the closed question in State 3 of FIG. 5 is assumed to be a positive reaction or a negative reaction. Also, it is assumed that, with the keywords "midnight program", "Television Kanto", and "drama", the program information candidates are assumed to be narrowed down to 21.

Next, the information processing apparatus 100 generates an interaction information display for displaying 21 program information candidates and an interaction information display for displaying input examples "Yes" and "No".

As a result, on the display screen D34, as an eleventh turn, the question "Would actor A in the cast be fine?" is displayed in a region D345, first information "Program candidates: 21" is displayed in a region outside and above the region D345, and second information "Input examples: Yes/No" is displayed in a region outside and below the region D345, each in a suitable mode.

Next, the information processing apparatus 100 acquires an input from the user "Good", and causes the input to be displayed as it is in a region D346 as a twelfth turn on the display screen D34. The information processing apparatus 100 comprehends the answer from the user as a positive reaction depicted in FIG. 5.

Next, the information processing apparatus 100 updates the interactive state at step S2. Specifically, the information processing apparatus 100 refers to FIG. 5, in which a positive reaction is inputted when a closed question is outputted in State 3, and thus determines that the interactive state stays at State 3.

<Thirteenth Turn>

Subsequently, the information processing apparatus 100 performs the process at step S3.

Here, with the keywords "midnight program", "Television Kanto", "drama", and "actor A in the cast", the program information candidates are narrowed down to four.

In this case, the information processing apparatus 100 refers to FIG. 5 to determine that the state is in State 3 and the number of program information candidates is four or less, and thus determines to present a conclusion. Although a template for conclusion presentation has not been described, such a template may be stored in the sentence generation data of FIG. 19.

The information processing apparatus 100 refers to FIG. 19 and captures the number of program information candidates to generate a system utterance display indicating, for example, "Four programs have been found".

As a result, on the display screen D44, as a thirteen turn, a conclusion presentation "Four programs have been found" is displayed in a region D441, and a list of four program information candidates acquired by narrowing-down, that is, found video contents, is displayed in a region outside and below the region D441.

Next, the information processing apparatus 100 updates the interactive state at step S2. Specifically, the information processing apparatus 100 refers to FIG. 5 to determine that the interactive state makes a transition from State 3 to State 5 when a conclusion presentation is outputted in State 3 and any input is acquired from the user, and updates the interactive state.

While the information processing method, the information processing apparatus, and others according to the present embodiment have been described, the present disclosure is not limited by this embodiment.

Also, each processor included in the information processing apparatus according to the embodiment is typically implemented as an LSI, that is, an integrated circuit. These processors may be each separately made as one chip, or may be entirely or partially made as one chip.

The integration may be not limited to be made by the LSI, but may be implemented by a dedicated circuit or a general-purpose processor. A field programmable gate array (FPGA) programmable after LSI manufacture or a reconfigurable processor in which connections and settings of circuit cells inside an LSI are reconfigurable may be used.

Also, the present disclosure may be implemented as an information processing method to be performed by an information processing apparatus.

Also, in the above embodiment, each component may be configured of dedicated hardware or may be implemented by executing a software program suitable for each component. Each component may be implemented by a program executer such as a CPU or processor reading and executing a software program recorded on a recording medium such as a hard disk or semiconductor memory.

Division of functional blocks in each block diagram is merely an example. A plurality of functional blocks may be implemented as one functional block, one functional block may be divided into a plurality of functional blocks, or a part of functions may be transferred to another functional block. Also, the functions of a plurality of functional blocks having similar functions may be processed by single hardware or software concurrently or in a time-division manner.

Also, the sequence in which the respective steps in a flowchart are performed is merely an example for specifically describing the present disclosure, and another sequence other than the above may be adopted. Also, a part of the steps may be simultaneously (concurrently) performed with another step.

In the foregoing, the information processing apparatus and others according to one or plurality of aspects have been described based on the embodiment. The present disclosure, however, is not limited to this embodiment. A mode configured by applying various modifications conceived by a person in the art to the present embodiment or a mode constructed by combining the components in different embodiments, both modes not deviating from the gist of the present disclosure, may be included in the scope of one or plurality of aspects.

The present disclosure can be applied to an information processing method, information processing apparatus, and recording medium having a program recorded thereon with a function of narrowing down and providing information in an interactive manner by using a database. For example, the present disclosure can be used for an information processing method, information processing apparatus, and recording medium having a program recorded thereon for providing medical inquiry information, recipe information, travel information, real estate information, video contents information, sightseeing information, recruitment information, matchmaking information, and so forth by interaction with users.

What is claimed is:

1. An information processing method in which display of a question generated by an information processing apparatus and acquisition of an answer from a user by a terminal to the question are repeated to narrow down information the user desires to make a search, the information processing method comprising:
    causing the information processing apparatus to display on a display included in the terminal a first question regarding a target of the search to be displayed in a first mode on the display;
    receiving with the terminal a first answer to the first question inputted from the user into the terminal and displaying the first answer on the display of the terminal,
    wherein when the first question is displayed, first information about a narrowing-down process for the search generated in response to the first question is displayed above the first question in a second mode, and second information comprising a guide for answering the first question is displayed below the first question in a third mode;
    displaying at least one question different but related to the first question and acquiring and displaying an answer to the displayed at least one different question in the narrowing-down process to narrow down search-target candidates comprising results of the search;
    generating search-target candidates in response to the display of both the at least one question different but related to the first question and the answer to the displayed at least one different question in the narrowing-down process; and
    displaying at least one generated search-target candidate of the generated search-target candidates during the narrowing-down process in response to the number of the search-target candidates produced by the narrowing-down progress being equal to or smaller than a predetermined number.

2. The information processing method according to claim 1, wherein
    the first question is displayed in the first mode by displaying text indicating the first question in a frame region surrounded by a frame in a balloon shape, a rectangular shape, or a corner-rounded rectangular shape under specifications specified with a predetermined font, font size, text color, background color, or typeface.

3. The information processing method according to claim 2, wherein
    when the first question is displayed, the first information is displayed in the second mode by displaying text indicating the first information in a region outside and above the frame region under specifications specified with a predetermined font, font size, text color, background color, or typeface.

4. The information processing method according to claim 3, wherein the specifications of the text indicating the first question in the first mode and the specifications of the text indicating the first information in the second mode are identical to each other.

5. The information processing method according to claim 3, wherein
when the first question is displayed, the second information is displayed in the third mode by displaying text indicating the second information in a region outside and below the frame region under specifications specified with a predetermined font, font size, text color, background color, or typeface.

6. The information processing method according to claim 5, wherein
the specifications of the text indicating the first question in the first mode and the specifications of the text indicating the second information in the third mode are identical to each other.

7. The information processing method according to claim 5, wherein
the specifications of the text indicating the first information in the second mode and the specifications of the text indicating the second information in the third mode are identical to each other.

8. The information processing method according to claim 1, wherein
the first information includes a number of the targets of the search when the first question is displayed.

9. The information processing method according to claim 1, wherein
the first information includes a remaining number of a predetermined total number of times allowed to question when the first question is displayed.

10. The information processing method according to claim 1, wherein
the first information includes a degree of progress indicating an accumulated number of times when the first question is displayed with respect to a predetermined total number of times allowed to question.

11. The information processing method according to claim 1, wherein
the second information indicates an answering method with an answer example including text indicating a positive reaction and text indicating a negative reaction.

12. The information processing method according to claim 1, wherein
the second information indicates an answering method with an answer example including a word allowing the target of the search to be narrowed down.

13. The information processing method according to claim 1, wherein
the target of the search is a plurality of cooking recipes or menus, and
the first question inquires about a request for the plurality of cooking recipes or menus.

14. The information processing method according to claim 1, wherein
the target of the search is a plurality of travel plans, and
the first question inquires about a request for the plurality of travel plans.

15. The information processing method according to claim 1, wherein
the target of the search is a plurality of real estate properties, and
the first question inquires about a request for the plurality of real estate properties.

16. The information processing method according to claim 1, wherein
the target of the search is a plurality of video contents, and
the first question inquires about a request for the plurality of video contents.

17. The information processing method according to claim 13, wherein
when the first question is displayed,
the first question inquires about the request for the plurality of cooking recipes or menus and is displayed in the first mode, a total number of the plurality of cooking recipes or menus included in a database is displayed above the first question as the first information, and the first answer is an answer example including a word indicating one food material or one classification included in the plurality of cooking recipes or menus based on the database and is displayed below the first question as the second information,
after the first answer to the first question is acquired, a second question for further inquiring about the request for the plurality of cooking recipes or menus is displayed in the first mode, a number of the plurality of cooking recipes or menus included in the database and acquired by narrowing-down with the first answer is displayed above the second question as the first information, and an answer example including a word indicating one food material or one classification included in the plurality of cooking recipes or menus included in the database and acquired by narrowing-down with the first answer is displayed below the second question as the second information, and
in the database, the plurality of cooking recipes, classification information indicating a classification for each of the plurality of cooking recipes, and food material information indicating a food material for use in each of the plurality of cooking recipes are associated with one another.

18. The information processing method according to claim 17, wherein
if the second answer to the second question includes a predetermined word, a third question for inquiring whether to request one classification included in the classification information or one food material included in the food material information is further displayed in the first mode, a number of the plurality of cooking recipes or menus included in the database and acquired by narrowing-down with the second answer to the second question is displayed above the third question as the first information, and an answer example including a word indicating a positive reaction to the one classification or the one food material and a word indicating a negative reaction is displayed below the third question as the second information.

19. The information processing method according to claim 18, further comprising:
causing information about the plurality of cooking recipes or menus included in the database and acquired by narrowing-down with a third answer to the third question to be displayed on the display if the third answer includes the word indicating the positive reaction and the number of the plurality of cooking recipes or menus included in the database and acquired by narrowing-down with the third answer is equal to or smaller than a threshold, wherein
if the number of the plurality of cooking recipes or menus included in the database and acquired by the third answer to the third question is not equal to or smaller than the threshold, a fourth question for inquiring whether to request a classification different from the one classification or a food material different from the one food material is displayed in the first mode, a number of the plurality of cooking recipes or menus included in the database and acquired by narrowing-down with the third answer is displayed above the fourth question as the first information, and an answer example including the word indicating the positive reaction and the word indicating the negative reaction is displayed below the fourth question as the second information.

20. An information processing apparatus in which display of a question and acquisition of an answer from a user by a terminal to the question are repeated to narrow down information the user desires to make a search, the information processing apparatus comprising:

a processor which:

causes the information processing apparatus to display on a display in the terminal a first question regarding a target of the search to be displayed in a first mode on the display causes the terminal to receive a first answer to the first question inputted from the user into the terminal and display the first answer on the display of the terminal, wherein when the first question is displayed, the processor causes first information about a narrowing-down process for the search generated in response to the first question to be displayed above the first question in a second mode and causes second information comprising a guide for answering the first question to be displayed below the first question in a third mode, the processor causes displaying of at least one question different but related to the first question and acquiring and displaying an answer to the displayed at least one different question in the narrowing-down process to narrow down search-target candidates comprising results of the search;

the processor causes generating of search-target candidates in response to the display of both the at least one question different but related to the first question and the answer to the displayed at least one different question in the narrowing-down process; and the processor causes displaying of at least one generated search-target candidate of the generated search-target candidates during the narrowing-down process in response to the number of the search-target candidates produced by the narrowing-down progress being equal to or smaller than a predetermined number.

21. A non-transitory recording medium having a program stored therein, the program for causing a computer to execute an information processing method in which display of a question generated by an information processing apparatus and acquisition of an answer from a user by a terminal to the question are repeated to narrow down information the user desires to make a search, the information processing method comprising:

causing the information processing apparatus to display on a display included in the terminal a first question regarding a target of the search to be displayed in a first mode on the display;

receiving with the terminal a first answer to the first question inputted from the user into the terminal and displaying the first answer on the display of the terminal, wherein when the first question is displayed, first information about a narrowing-down process for the search generated in response to the first question is displayed above the first question in a second mode, and second information comprising a guide for answering the first question is displayed below the first question in a third mode;

displaying at least one question different but related to the first question and acquiring and displaying an answer to the displayed at least one different question in the narrowing-down process to narrow down search-target candidates comprising results of the search;

generating search-target candidates in response to the display of both the at least one question different but related to the first question and the answer to the displayed at least one different question in the narrowing-down process; and displaying at least one generated search-target candidate of the generated search-target candidates during the narrowing-down process in response to the number of the search-target candidates produced by the narrowing-down progress being equal to or smaller than a predetermined number.

* * * * *